US012593368B2

(12) United States Patent
Agiwal et al.

(10) Patent No.: US 12,593,368 B2
(45) Date of Patent: Mar. 31, 2026

(54) METHOD AND APPARATUS FOR GENERATING MAC CE FOR BEAM FAILURE RECOVERY IN WIRELESS COMMUNICATION SYSTEM

(71) Applicant: SAMSUNG ELECTRONICS CO., LTD., Suwon-si (KR)

(72) Inventors: Anil Agiwal, Suwon-si (KR); Seungri Jin, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 18/061,223

(22) Filed: Dec. 2, 2022

(65) Prior Publication Data

US 2023/0180332 A1     Jun. 8, 2023

(30) Foreign Application Priority Data

Dec. 3, 2021     (KR) ........................ 10-2021-0171681

(51) Int. Cl.
| | |
|---|---|
| *H04W 72/231* | (2023.01) |
| *H04L 5/00* | (2006.01) |
| *H04W 76/19* | (2018.01) |

(52) U.S. Cl.
CPC ........... *H04W 76/19* (2018.02); *H04L 5/0048* (2013.01); *H04W 72/231* (2023.01)

(58) Field of Classification Search
CPC ... H04W 76/19; H04W 72/231; H04W 76/15; H04W 24/08; H04W 72/046; H04L 5/0048; H04L 5/0023; H04L 5/0094; H04B 7/06964; H04B 7/024
See application file for complete search history.

(56) References Cited

U.S. PATENT DOCUMENTS

| | | | |
|---|---|---|---|
| 2020/0052769 A1* | 2/2020 | Cirik | H04B 7/06964 |
| 2020/0350972 A1 | 11/2020 | Yi et al. | |
| 2022/0104036 A1* | 3/2022 | Zhou | H04W 24/04 |
| 2023/0139655 A1* | 5/2023 | Guo | H04W 36/085 370/329 |
| 2023/0199529 A1* | 6/2023 | Koskela | H04L 5/0091 370/216 |
| 2023/0353223 A1* | 11/2023 | Jia | H04B 7/06954 |
| 2024/0340068 A1* | 10/2024 | Wu | H04W 72/23 |

FOREIGN PATENT DOCUMENTS

| | | |
|---|---|---|
| WO | 2021240051 A1 | 12/2021 |
| WO | 2022200078 A1 | 9/2022 |

OTHER PUBLICATIONS

Supplementary European Search Report dated Oct. 2, 2024, in connection with European Patent Application No. 22901850.2, 10 pages.

(Continued)

*Primary Examiner* — Edan Orgad
*Assistant Examiner* — Malick A Sohrab

(57) ABSTRACT

The disclosure relates to a 5G or 6G communication system for supporting a higher data transmission rate. The disclosure proposes a method and an apparatus of generating medium access control (MAC) control element (CE) for beam failure recovery.

20 Claims, 15 Drawing Sheets

| $C_7$ | $C_6$ | $C_5$ | $C_4$ | $C_3$ | $C_2$ | $C_1$ | $C_0$ |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $S_7$ | $S_6$ | $S_5$ | $S_4$ | $S_3$ | $S_2$ | $S_1$ | $S_0$ |
| $S_{15}$ | $S_{14}$ | $S_{13}$ | $S_{12}$ | $S_{11}$ | $S_{10}$ | $S_9$ | $S_8$ |
| $S_{23}$ | $S_{22}$ | $S_{21}$ | $S_{20}$ | $S_{19}$ | $S_{18}$ | $S_{17}$ | $S_{16}$ |
| $S_{31}$ | $S_{30}$ | $S_{29}$ | $S_{28}$ | $S_{27}$ | $S_{26}$ | $S_{25}$ | $S_{24}$ |

One or 2 octet Beam failure recovery information of a serving cell

. . .

One or 2 octet Beam failure recovery information of a serving cell

(56) References Cited

OTHER PUBLICATIONS

ZTE: "Further details on Multi-beam and Multi-TRP operation," R1-2108877, 3GPP TSG RAN WG1 Meeting #106bis-e , e-Meeting, Oct. 11-19, 2021, 16 pages.

International Search Report and Written Opinion of the International Searching Authority dated Mar. 2, 2023, in connection with International Application No. PCT/KR2022/019420, 7 pages.

Samsung, "MAC Running CR for Rel-17 feMIMO," 3GPP TSG RAN2 Meeting #116-e, R2-2111662, Electronic, Nov. 1-12, 2021, 44 pages.

Qualcomm Incorporated, "Discussion on multi-TRP BFR and new MIMO MAC CEs," 3GPP TSG RAN2 Meeting #116-e, R2-2110748, Electronic, Nov. 1-12, 2021, 6 pages.

Huawei et al., "Beam failure recovery for multi-TRP," 3GPP TSG RAN2 Meeting #116-e, R2-2110877, Electronic, Nov. 1-12, 2021, 4 pages.

Intel Corporation, "Remaining issues on mTRP BFR," 3GPP TSG RAN2 Meeting #116-e, R2-2109642, Electronic, Nov. 1-12, 2021, 6 pages.

* cited by examiner

FIG. 1

| $C_7$ | $C_6$ | $C_5$ | $C_4$ | $C_3$ | $C_2$ | $C_1$ | SP |
|-------|-------|-------|-------|-------|-------|-------|-----|
| AC | R | Candidate RS ID or R bits | | | | | |

. . .

| AC | R | Candidate RS ID or R bits |
|----|---|---------------------------|

FIG. 2

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bits | | | | | |

• • •

| AC | R | Candidate RS ID or R bits |
|---|---|---|

FIG. 5

| $C_7$ | $C_6$ | $C_5$ | $C_4$ | $C_3$ | $C_2$ | $C_1$ | $C_0$ |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

One or 2 octet Beam failure recovery information $\bullet \quad \bullet \quad \bullet$ One or 2 octet Beam failure recovery information

FIG. 6

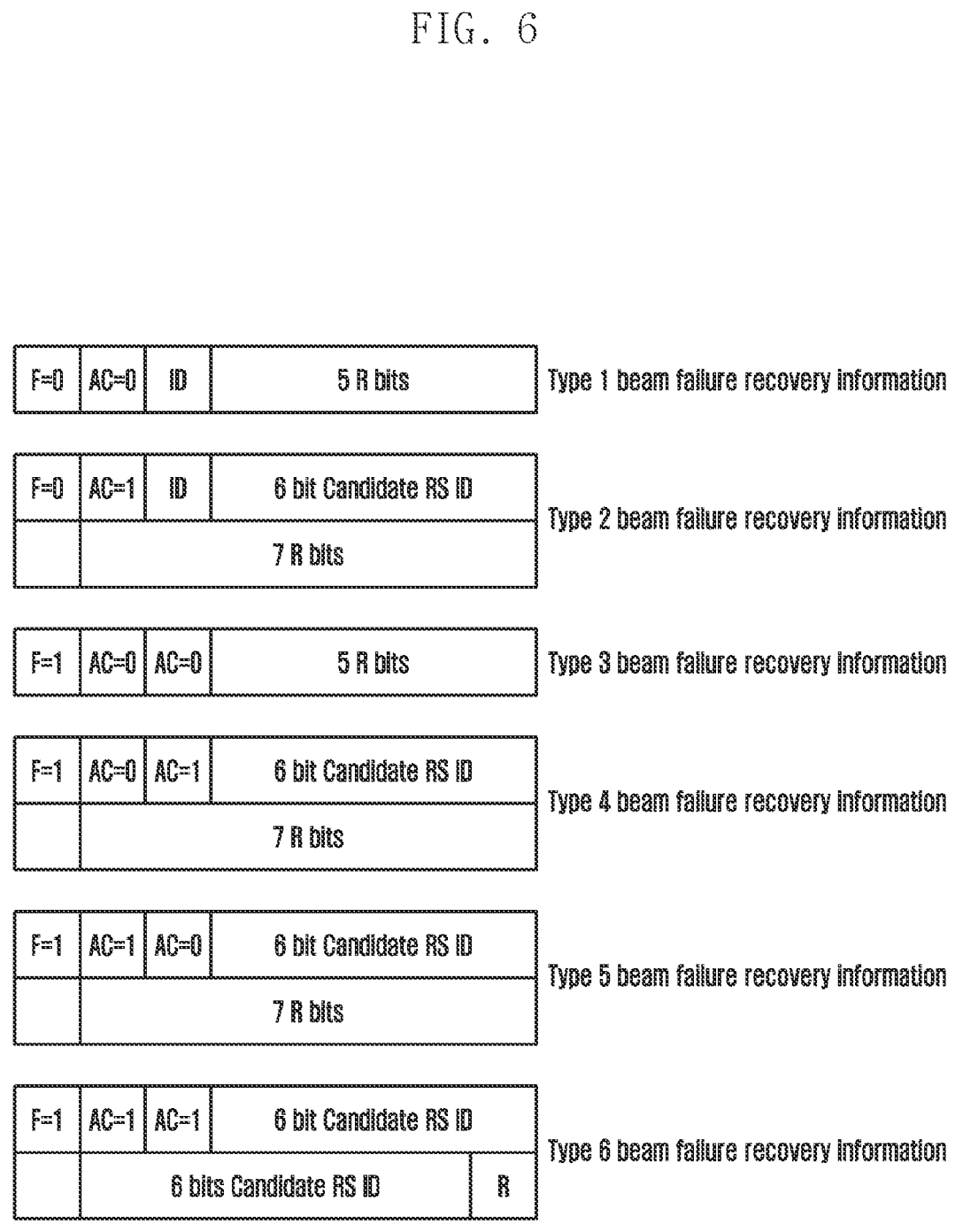

| F=0 | AC=0 | ID | 5 R bits |
|---|---|---|---|

Type 1 beam failure recovery information

| F=0 | AC=1 | ID | 6 bit Candidate RS ID |
|---|---|---|---|
| | 7 R bits | | |

Type 2 beam failure recovery information

| F=1 | AC=0 | AC=0 | 5 R bits |
|---|---|---|---|

Type 3 beam failure recovery information

| F=1 | AC=0 | AC=1 | 6 bit Candidate RS ID |
|---|---|---|---|
| | 7 R bits | | |

Type 4 beam failure recovery information

| F=1 | AC=1 | AC=0 | 6 bit Candidate RS ID |
|---|---|---|---|
| | 7 R bits | | |

Type 5 beam failure recovery information

| F=1 | AC=1 | AC=1 | 6 bit Candidate RS ID | |
|---|---|---|---|---|
| | 6 bits Candidate RS ID | | | R |

Type 6 beam failure recovery information

FIG. 7

| F | ID | Candidate RS ID 1 |
|---|----|-------------------|
| R | R | Candidate RS ID 2 |

2$^{nd}$ Octet is present if F = 1.
Otherwise only 1 octet is present

Candidate RS ID is set to 0, if candidate beam is not available.
Otherwise it is set to candidate beam ID

FIG. 8

| F | ID | Candidate RS ID 1 |
|---|----|-------------------|
| R | ID | Candidate RS ID 2 |

2$^{nd}$ Octet is present if F = 1.
Otherwise only 1 octet is present

Candidate RS ID is set to 0, if candidate beam is not available.
Otherwise it is set to candidate beam ID

| E | ID | Candidate RS ID 1 |
|---|---|---|

| E | ID | Candidate RS ID n |
|---|---|---|

Nth Octet is present if E = 1 in N-1th Octet.
N is equal to number of TRPs (BFD-RS sets) in serving cell Candidate RS ID is set to 0, if candidate beam is not available.
Otherwise it is set to candidate beam ID

FIG. 10

| $C_7$ | $C_6$ | $C_5$ | $C_4$ | $C_3$ | $C_2$ | $C_1$ | $C_0$ |
|---|---|---|---|---|---|---|---|
| $S_7$ | $S_6$ | $S_5$ | $S_4$ | $S_3$ | $S_2$ | $S_1$ | $S_0$ |

One or 2 octet Beam failure recovery information of a serving cell

. . .

One or 2 octet Beam failure recovery information of a serving cell

FIG. 11

| $C_7$ | $C_6$ | $C_5$ | $C_4$ | $C_3$ | $C_2$ | $C_1$ | $C_0$ |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $S_7$ | $S_6$ | $S_5$ | $S_4$ | $S_3$ | $S_2$ | $S_1$ | $S_0$ |
| $S_{15}$ | $S_{14}$ | $S_{13}$ | $S_{12}$ | $S_{11}$ | $S_{10}$ | $S_9$ | $S_8$ |
| $S_{23}$ | $S_{22}$ | $S_{21}$ | $S_{20}$ | $S_{19}$ | $S_{18}$ | $S_{17}$ | $S_{16}$ |
| $S_{31}$ | $S_{30}$ | $S_{29}$ | $S_{28}$ | $S_{27}$ | $S_{26}$ | $S_{25}$ | $S_{24}$ |

One or 2 octet Beam failure recovery information of a serving cell

• • •

One or 2 octet Beam failure recovery information of a serving cell

FIG. 12

| AC | ID | Candidate RS ID or R bits |
|----|----|---------------------------|
| AC | ID | Candidate RS ID or R bits |

2$^{nd}$ Octet is present if S = 1.
Otherwise only 1 octet is present

FIG. 13

| $C_7$ | $C_6$ | $C_5$ | $C_4$ | $C_3$ | $C_2$ | $C_1$ | $C_0$ |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $S_7$ | $S_6$ | $S_5$ | $S_4$ | $S_3$ | $S_2$ | $S_1$ | $S_0$ |

One or 2 octet Beam failure recovery information for Serving cell with index 2

One or 2 octet Beam failure recovery information for Serving cell with index 13

One or 2 octet Beam failure recovery information for Serving cell with index 22

One or 2 octet Beam failure recovery information for Serving cell with index 31

METHOD AND APPARATUS FOR GENERATING MAC CE FOR BEAM FAILURE RECOVERY IN WIRELESS COMMUNICATION SYSTEM

CROSS-REFERENCE TO RELATED APPLICATION

This application is based on and claims priority under 35 U.S.C. § 119 to Korean Patent Application No. 10-2021-0171681 filed on Dec. 3, 2021, in the Korean Intellectual Property Office, the disclosure of which is herein incorporated by reference in its entirety.

BACKGROUND

1. Field

The disclosure relates to operations of a user equipment (UE) and a base station in a wireless communication system. More particularly, the disclosure relates to a method and an apparatus of generating medium access control (MAC) control element (CE) for beam failure recovery in a wireless communication system.

2. Description of Related Art $5^{th}$ generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (minWave) including 28 GHz and 39 GHz. In addition, it has been considered to implement $6^{th}$ generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra. Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal includes receiving configuration information for a serving cell, the configuration information configuring a first beam failure detection (BFD)-reference signal (RS) set and a second BFD-RS set; identifying whether a beam failure recovery (BFR) for the first BFD-RS set of the serving cell is triggered; identifying whether a beam failure recovery (BFR) for the second BFD-RS set of the serving cell is triggered; in case that at least one BFR is triggered and not cancelled for the serving cell for which evaluation of candidate beams has been completed, identifying a BFR medium access control (MAC) control element (CE) comprising a first field indicating whether beam failure is detected for the serving cell and a second field indicating whether beam failure is detected for one or two BFD-RS sets of the serving cell; and transmitting the BFR MAC CE.

In accordance with another aspect of the disclosure, a method performed by a base station includes transmitting, to a terminal, configuration information of a serving cell, the configuration information comprising a first BFD-RS set and a second BFD-RS set; and receiving, from the terminal that identifies at least one BFR is triggered and not cancelled for the serving cell for which evaluation of candidate beams has been completed, a BFR MAC CE, wherein the BFR MAC CE comprises a first field indicating whether beam failure is detected for the serving cell and a second field indicating whether beam failure is detected for one or two BFD-RS sets of the serving cell.

In accordance with another aspect of the disclosure, a terminal comprises a transceiver and a controller configured to receive configuration information for a serving cell, the configuration information configuring a first BFD-RS set and a second BFD-RS set, identify whether a BFR for the first BFD-RS set of the serving cell is triggered, identify whether a BFR for the second BFD-RS set of the serving cell is triggered, in case that at least one BFR is triggered and not cancelled for the serving cell for which evaluation of candidate beams has been completed, identify a BFR MAC CE comprising a first field indicating whether beam failure is detected for the serving cell and a second field indicating whether beam failure is detected for one or two BFD-RS sets of the serving cell, and transmit the BFR MAC CE.

In accordance with another aspect of the disclosure, a base station comprises a transceiver and a controller configured to transmit, to a terminal, configuration information of a serving cell, the configuration information comprising a first BFD-RS set and a second BFD-RS set, and receive, from the terminal that identifies at least one BFR is triggered and not cancelled for the serving cell for which evaluation of candidate beams has been completed, a BFR MAC CE, wherein the BFR MAC CE comprises a first field indicating whether beam failure is detected for the serving cell and a second field indicating whether beam failure is detected for one or two BFD-RS sets of the serving cell.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions desciibed below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Figure 1:
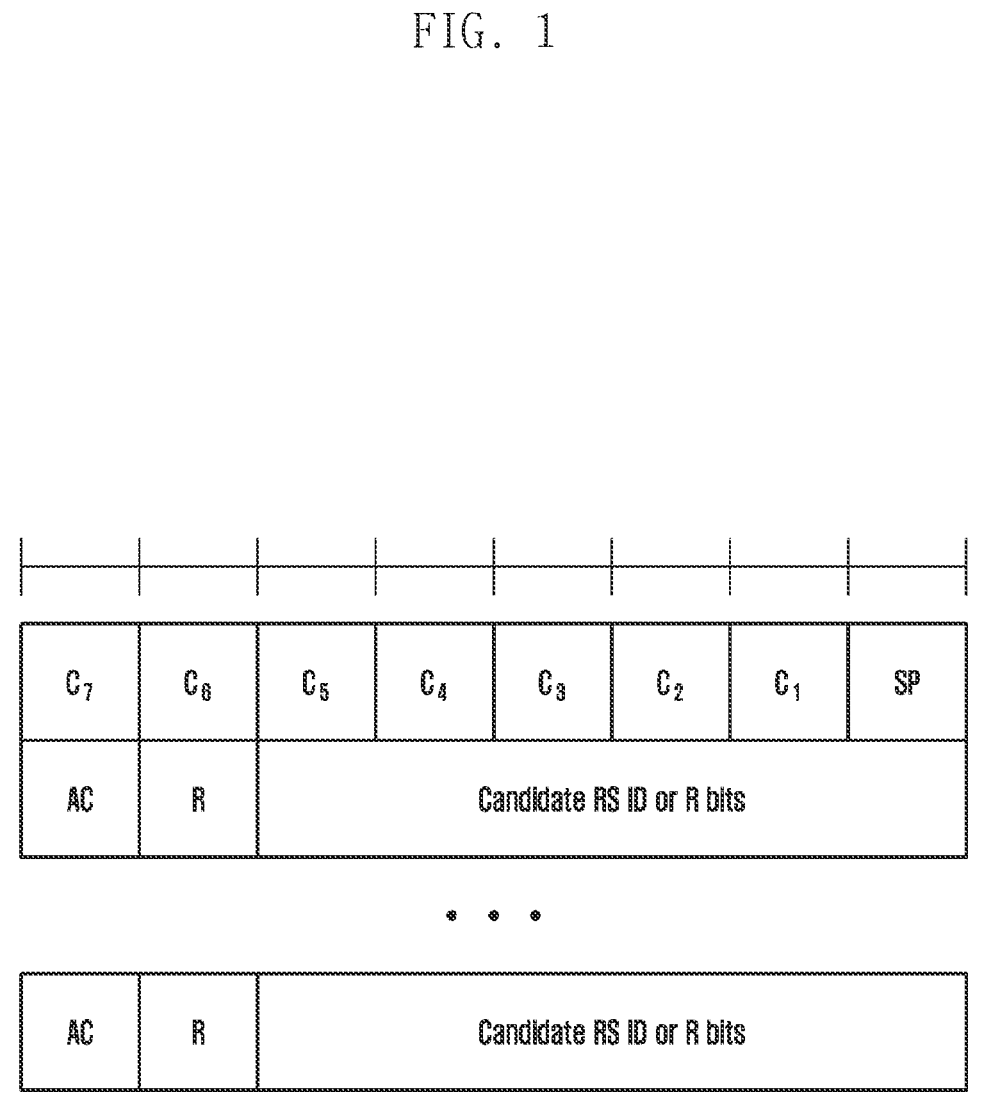

FIG. 1 illustrates an example of a beam failure recovery (BFR) MAC CE format according to an embodiment of the present disclosure;

FIG. 2 illustrates an example of a BFR MAC CE format according to an embodiment of the present disclosure;

FIG. 5 illustrates an example of an enhanced BFR MAC CE format for multi TRP BFR according to an embodiment of the present disclosure;

FIG. 6 illustrates an example of beam failure recovery information according to an embodiment of the present disclosure;

FIG. 7 illustrates an example of beam failure recovery information according to an embodiment of the present disclosure;

FIG. 8 illustrates an example of beam failure recovery information according to an embodiment of the present disclosure;

FIG. 10 illustrates an example of an enhanced BFR MAC CE format for multi TRP BFR according to an embodiment of the present disclosure;

FIG. 11 illustrates an example of an enhanced BFR MAC CE format for multi TRP BFR according to an embodiment of the present disclosure;

FIG. 12 illustrates an example of beam failure recovery information according to an embodiment of the present disclosure;

FIG. 13 illustrates an example of an enhanced BFR MAC CE format for multi TRP BFR according to an embodiment of the present disclosure;

DETAILED DESCRIPTION

Figure 3:
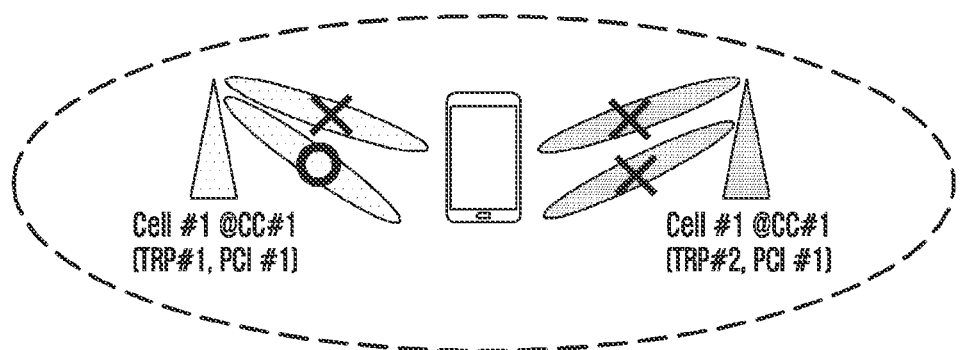
FIG. 3 illustrates an example of beam failure detection (BFD) and BFR for multi transmission/reception points (TRPs) according to an embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5$^{th}$ generation mobile communication technologies (5G new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit". Moreover, the elements and "units" or may be implemented to reproduce one or more CPUs within a device or a security multimedia card. Further, the "unit" in the embodiments may include one or more processors.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the 4G wireless communication system suffers from lack of resources to meet the growing demand for high speed data services. So, 5G wireless communication system (also referred as next generation radio or NR) is being developed to meet the growing demand for high speed data services, support ultra-reliability and low latency applications.

The 5G wireless communication system supports not only lower frequency bands but also in higher frequency (mm-Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of 5G wireless communication system. In addition, the 5G wireless communication system is expected to address different use cases having quite different requirements in terms of data rate, latency, reliability, mobility etc. However, it is expected that the design of the air-interface of the 5G wireless communication system would be flexible enough to serve the UEs having quite different capabilities depending on the use case and market segment the UE cater service to the end customer. Few example use cases the 5G wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5G wireless communication system operating in higher frequency (mmWave) bands, a UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance.

Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The 5G wireless communication system, supports standalone mode of operation as well dual connectivity (DC). In DC a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MIN is connected to the core network. NR also supports multi-RAT dual connectivity (MR-DC) operation whereby a UE in RRC_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with CA/DC there is only one serving cell comprising of the primary cell.

For a UE in RRC_CONNECTED configured with CA/DC the term "serving cells" is used to denote the set of cells comprising of the Special Cell(s) and all secondary cells. In NR the term master cell group (MCG) refers to a group of serving cells associated with the Master node, comprising of the PCell and optionally one or more SCells. In NR the term secondary cell group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the 5G wireless communication system, physical downlink control channel (PDCCH) is used to schedule DL transmissions on PDSCH and UL transmissions on PUSCH, where the downlink control information (DCI) on PDCCH includes: downlink assignments containing at least modulation and coding format, resource allocation, and hybrid-ARQ information related to DL-SCH; uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; activation and deactivation of PDSCH semi-persistent transmission; Notifying one or more UEs of the slot format; notifying one or more UEs of the PRB(s) and OFDM symbol(s) where the UE may assume no transmission is intended for the UE; transmission of TPC commands for PUCCH and PUSCH; transmission of one or more TPC commands for SRS transmissions by one or more UEs; switching a UE's active bandwidth part; initiating a random access procedure.

A UE monitors a set of PDCCH candidates in the configured monitoring occasions in one or more configured control resource sets (CORESETs) according to the corresponding search space configurations. A CORESET comprises a set of PRBs with a time duration of 1 to 3 OFDM symbols. The resource units resource element groups (REGs) and control channel elements (CCEs) are defined within a CORESET with each CCE comprising a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In 5G wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by a gNB. In NR search space configuration comprises of parameters Monitoring-periodicity- PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation below:

$$(y*(\text{number of slots in a radio frame})+x-\text{Monitoring-offset-slot})\text{mod (Monitoring-periodicity-PDCCH-slot})=0.$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by a gNB via RRC signaling. One of the TCI state in a TCI state list is activated and indicated to the VIE by the gNB. A TCI state indicates the DL TX beam (DL TX beam is QCLed with SSB/CSI RS of TCI state) used by GNB for transmission of PDCCH in the PDCCH monitoring occasions of a search space.

In 5G wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a bandwidth part (BWP). BA is achieved by configuring RRC connected UE with BWP(s) and telling the UE which of the configured BWPs is currently the active one. When BA is configured, the tiE only may monitor PDCCH on the one active BWP i.e., it may not monitor PDCCH on the entire DL frequency of the serving cell. In an RRC connected state, the UE is configured with one or more DL and UL BWPs, for each configured serving cell (i.e., PCell or SCell).

For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimmer, by RRC signaling, or by the MAC entity itself upon initiation of random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization, RA is used during initial access, handover, radio resource control (RRC) connection re-establishment procedure, scheduling request transmission, secondary cell group (SCG) additionlmodification, beam failure recovery and data or control information transmission in UL by a non-synchronized UE in an RRC CONNECTED state. Several types of random access procedure is supported.

Contention based random access (CBRA): this is also referred as 4 step CBRA. In this type of random access, a UE first transmits random access preamble (also referred as Msg1) and then waits for random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by a gNB. The RA-RNTI is calculated as follows: RA-RNTI=1+s_id+14*t_id+14*80*f_id 14*80*8*ul_carrier_id, where s_id is the index of the first orthogonal frequency division multiplexing (OFDM) symbol of the PRACH occasion where the UE has transmitted Msg1, i.e., RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by a gNB can be multiplexed in the same RAR media access control (MAC) protocol data unit (PDU) by the gNB.

An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by a gNB in RACH configuration) number of times, the UE goes back to first step i.e., select random access resource (preamble/RACH occasion) and transmits the RA preamble. A backoff may be applied bdore going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed.

While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA): this is also rderred as legacy CFRA or 4 step CFRA. CFRA procedure is used for scenarios such as handover where low latency is required, timing advance establishment for secondary cell (Scell), etc. Evolved node B (eNB) assigns to a UE dedicated Random access preamble. The UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by a gNB in RACH configuration) number of times, the UE retransmits the RA preamble.

For certain events such has handover and beam failure recovery if dedicated preamble(s) are assigned to a UE, during first step of random access i.e., during random access resource selection for Msg1 transmission the UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by a gNB, a UE selects non dedicated preamble. Otherwise, a UE selects a dedicated preamble. So, during the RA procedure, one random access attempt can be CFRA while other random access attempt can be CBRA.

2 step contention based random access (2 step CBRA): in the first step, a UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., a gNB) within a configured window. The response is also referred as MsgB. If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to C-RNTI. If contention resolution is successful, random access procedure is considered successfully completed.

Instead of contention resolution information corresponding to the transmitted MsgA, MsgB may include a fallback information corresponding to the random access preamble transmitted in MsgA. If the fallback information is received, the UE transmitsMsg3 and performs contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitor network response after transmitting MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e., the UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE Ds (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure.

When the UE performs RA after power on (before it is attached to the network), then a UE ID is the random ID. When the UE performs RA in an IDLE state after it is attached to network, the UE ID is S-TMSI. If the UE has an assigned C-RNTI (e.g., in a connected state), the UE ID is C-RNTI. In case the UE is in an INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): in this case, a gNB assigns to a UE dedicated Random access preamble (s) and PUSCH resource(s) for MsgA transmission, RO(s) to be used for preamble transmission may also be indicated. In the first step, the UE transmits random access preamble on PRACH and a payload on PUSCH using the contention free random access resources (i.e., dedicated preamble/PUSCH resource/RO). In the second step, after MsgA transmission, the UE monitors for a response from the network (i.e., a gNB) within a configured window. If the UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to the UE, during first step of random access i.e., during random access resource selection for MsgA transmission the UE determines whether to transmit dedicated preamble or non-dedicated preamble, Dedicated preambles is typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by the gNB, the UE select non dedicated preamble. Otherwise, the UE selects a dedicated preamble. So, during the RA procedure, one random access attempt can be 2 step CERA while other random access attempt can be 2 step CBRA.

Upon initiation of random access procedure, the UE first selects the carrier (SUL or NUL). If the carrier to use for the random access procedure is explicitly signalled by a gNB, the UE selects the signalled carrier for performing random access procedure. If the carrier to use for the random access procedure is not explicitly signalled by the gNB; and if the serving cell for the random access procedure is configured with supplementary uplink and if the RSRP of the downlink pathloss reference is less than rsrp-ThresholdSSB-SUL: the UE selects the SUL carrier for performing random access procedure. Otherwise, the UE selects the NUL carrier for performing random access procedure. Upon selecting the UL carrier, the UE determines the UL and DL BWP for random access procedure as specified in section 5.15 of TS 38,321. the UE then determines whether to perform 2 step or 4 step RACH for this random access procedure:

If this random access procedure is initiated by PDCCH order and if the ra-PreambleIndex explicitly provided by PDCCH is not 0b000000, the LE selects 4 step RACH;

else if 2 step contention free random access resources are signaled by a gNB for this random access procedure, the UE selects 2 step RACH;

else if 4 step contention free random access resources are signaled by a gNB for this random access procedure, the UE selects 4 step RACH;

else if the UL BWP selected for this random access procedure is configured with only 2 step RACH resources, the UE selects 2 step RACH;

else if the UL BWP selected for this random access procedure is configured with only 4 step RACH resources, the UE selects 4 step RACH.

else if the UL BWP selected for this random access procedure is configured with both 2 step and 4 step RACH resources; and if RSRP of the downlink pathloss reference is below a configured threshold, the UE selects 4 step RACH. Otherwise, the UE selects 2 step RACH.

In the 5G wireless communication system, node B (gNB) or base station in cell broadcast Synchronization Signal and PBCH block (SSB) comprises primary and secondary synchronization signals (PSS, SSS) and system information. System information includes common parameters needed to communicate in cell. In the 5G wireless communication system (also referred as next generation radio or NR), system information (SI) is divided into the MIB and a number of SIBs where:

the MIB is always transmitted on the BCH with a periodicity of 80 ms and repetitions made within 80 ms and it includes parameters that are needed to acquire SIB1 from the cell;

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting a gNB to broadcast one or more SI message(s);

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB 1 can be configured to be cell specific or area specific, using an indication in SIB1. The cell specific SIB is applicable only within a cell that provides the SIB while the area specific SIB is applicable within an area referred to as SI area, which comprises one or several cells and is identified by systemInformationAreaID.

A UE acquires SIB 1 from the camped or serving cell. The UE checks the BroadcastStatus bit in SIB 1 for SI message which the LE needs to acquire. SI request configuration for SUL is signaled by a gNB using the IE si-RequestConfigSUL in SIB1. If the IE si-RequestConfigSUL is not present in SIB1, the UE considers that SI request configuration for SUL, is not signaled by the gNB. SI request configuration for NUL is signaled by the gNB using the IE si-RequestConfig in SIB1. If the IE si-RequestConfig is not present in SIB1, the UE considers that SI request configuration for NUL is not signaled by the gNB. If SI message which the UE needs to acquire is not being broadcasted (i.e., BroadcastStatus bit is set to zero), the UE initiates transmission of SI request. The procedure for SI request transmission is as follows:

If SI request configuration is signaled by a gNB for SUL, and criteria to select SUL is met (i.e., RSRP derived from SSB measurements of camped or serving cell<rsrp-ThresholdSSB-SUL, where rsrp-ThresholdSSB-SUL is signaled by the gNB (e.g., in broadcast signaling such as SIB1)): the UE initiate transmission of SI request based on Msg1 based SI request on SUL. In other words, the UE initiates random access procedure using the PRACH preamble(s) and PRACH resource(s) in SI request configuration of SUL. The UE transmits Msg1 (i.e., Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, the UE monitors the SI window of the requested SI message in one or more SI period(s) of that SI message;

Else if SI request configuration is signaled by the gNB for NUL and criteria to select NUL is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): the UE initiates transmission of SI request based on Msg1 based SI request on NUL (350). In other words, the UE initiates random access procedure using the PRACH preamble(s) and PRACH resource(s) in SI request configuration of NUL. The UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, the UE monitors the SI window of the requested SI message in one or more SI period(s) of that SI message; and Else the UE initiates transmission of SI request based on Msg3 based SI request. In other words, the UE initiate transmission of RRCSysteminfoRequest message (345). The UE transmits Msg1 (i.e., Random access preamble) and waits for random access response. Common random access resources (PRACH preamble(s) and PRACH occasions(s)) are used for Msg1. In the UL grant received in random access response, the UE transmits RRCSystemInfoRequest message and waits for acknowledgement for SI request (i.e., RRCSystemInfoRequest message). If acknowledgement for SI request (i.e., RRCSystemInfoRequest message) is received, the UE monitors the SI window of the requested SI message in one or more SI period(s) of that SI message. Note that if SUL is configured, UL carrier for Msg1 transmission may be selected by the UE in similar manner as selected by the UE for Msg1 based SI request. SUL is the selected UL carrier, if RSRP derived from SSB measurements of camped or serving cell<rsrp-ThresholdSSB-SUL where rsrp-ThresholdSSB-SUL is signaled by a gNB (e.g., in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by the gNB (e.g., in broadcast signaling such as SIB1).

In the 5G wireless communication system, RRC can be in one of the following states: RRC_IDLE, RRC_INACTIVE, and RRC_CONNECTED. A UE is either in an RRC_CONNECTED state or in an RRC_INACTIVE state when an RRC connection has been established. If this is not the case, i.e., no RRC connection is established, the UE is in an RRC_IDLE state. The RRC states can further be characterized as follows:

In the RRC_IDLE, a UE specific DRX may be configured by upper layers. The UE monitors short messages transmitted with P-RNTI over DCI; monitors a paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; the UE stores the UE Inactive AS context; a RAN-based notification area is configured by RRC layer. The UE monitors short messages transmitted with P-RNTI over DCI; monitors a paging channel for CN paging using 5G-S-TMST and RAN paging using full I-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the LIE stores the AS context and transfer of unicast data to/from the UE takes place. The UE monitors short messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to an RRC_INACTIVE state. If the UE is configured with SCG, the UE releases the SCG configuration upon initiating a RRC connection resume procedure. The RRC message to suspend the RRC connection is integrity protected and ciphered.

The resumption of a suspended RRC connection is initiated by upper layers when the UE needs to transit from an RRC_INACTIVE state to an RRC_CONNECTED state or by RRC layer to perform an RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send the UE to RRC_CONNECTED, or reject the request to resume and send the UE to RRC_INACTIVE (with a wait timer), or directly re-suspend the RRC connection and send the UE to RRC_INACTIVE, or directly release the RRC connection and send the UE to RRC_IDLE, or instruct the UE to initiate NAS level recovery (in this case the network sends an RRC setup message).

Upon initiating the resume procedure, the UE is configured to:

apply the default L1 parameter values as specified in corresponding physical layer specifications, except for the parameters for which values are provided in SIB1; apply the default MAC Cell Group configuration; apply the CCCH configuration; start timer T319; apply the timeAlignment-TimerCommon included in SIB1; apply the default SRB1 configuration; set the variable pendingRNA-Update to false; initiate transmission of the RRCResumeRequest message or RRCResumeRequest1; restore the RRC configuration, RoHC state, the stored QoS flow to DRB mapping rules and the KgNB and $K_{RRCint}$ keys from the stored UE Inactive AS context except for the following: masterCellGroup, mrdc-SecondaryCellGroup, if stored; and pdcp-Config; set the resumeMAC-1 to the 16 least significant bits of the MAC-1 calculated: with the $K_{RRCint}$ key in the UE inactive AS context and the previously configured integrity protection algorithm; and with all input bits for COUNT, BEARER and DIRECTION set to binary ones; derive the $K_{gNB}$ key based on the current $K_{gNB}$ key or the NH, using the stored nextHopChainingCount value; derive the $K_{RRCenc}$ key, the $K_{RRCint}$ key, the $K_{UPint}$ key and the $K_{UPenc}$ key; configure lower layers to apply integrity protection for all signaling radio bearers except SRB0 using the configured algorithm and the $K_{RRCint}$ key and $K_{UPint}$ key, i.e., integrity protection may be applied to all subsequent messages received and sent by the UE; configure lower layers to apply ciphering for all signaling radio bearers except SRB0 and to apply the configured ciphering algorithm, the $K_{RRCenc}$ key and the $K^{UPenc}$ key derived in this subclause, i.e., the ciphering configuration may be applied to all subsequent messages received and sent by the UE; re-establish PDCP entities for SRB1; resume SRB1; transmit RRCResumeRequest or RRCResumeRequest.

The 5G wireless communication system supports beam failure detection and recovery mechanism at a UE for serving cell. This comprises of beam failure detection, new candidate beam identification, beam failure recovery request transmission and monitoring response for beam failure recovery request. For beam failure detection of a serving cell, a UE is configured with a list of beam failure detection RSs (SSB or CSI-RS based) for that serving cell. The UE monitors these RSs periodically. A beam failure is detected on a serving cell if number of consecutive detected beam failure instance exceeds a configured maximum number (beamFailureInstanceMaxCount) within a configured time (beamFailureDetectionTimer). A beam failure instance means that hypothetical PDCCH BLER determined based on measurement of beam failure detection RS is above a threshold for all beam failure detection RSs. Beam failure detection may be configured for zero or one or more serving cells. Upon beam failure instance, lower layer i.e., PHY sends indication to MAC. The MAC entity in the UE for each serving cell configured for beam failure detection, may perform the following operation:

1>if beam failure instance indication has been received from lower layers:
   2>start or restart the beamFailureDetectionTimer;
   2>increment BFI_COUNTER by 1;
   2>if BFI_COUNTER >= beamFailureInstanceMaxCount:
      3>if the serving cell is SCell:
         4>trigger a BFR for this serving cell;
      3>else:
         4>initiate a random access procedure on the SpCell.
1>if the beamFailureDetectionTimer expires; or
1>if beamFailureDetectionTimer, beamFailureInstanceMaxCount, or any of the reference signals used for beam failure detection is reconfigured by upper layers (i.e., RRC) associated with this serving cell:
   2>set BFI_COUNTER to 0.
1>if the serving cell is SpCell and the random access procedure initiated for SpCell beam failure recovery is successfully completed:
   2>set BFI_COUNTER to 0;
   2>stop the beamFailureRecoveryTimer, if configured;
   2>consider the beam failure recovery procedure successfully completed.

-continued

---

1>else if the serving cell is SCell, and a PDCCH addressed to C-RNTI indicating uplink grant
for a new transmission is received for the HARQ process used for the transmission of the
BFR MAC CE or Truncated BFR MAC CE which contains beam failure recovery
information of this serving cell; or
1>if the SCell is deactivated:
  2>set BFI_COUNTER to 0;
  2>consider the beam failure recovery procedure successfully completed and cancel all the
    triggered BFRs for this serving cell.

---

The MAC entity may:

---

1>if the beam failure recovery procedure determines that at least one BFR has been triggered
and
  not cancelled:
    2>if UL-SCH resources are available for a new transmission and if the UL-SCH resources
      can accommodate the BFR MAC CE plus its subheader as a result of LCP:
      3>instruct the Multiplexing and Assembly procedure to generate the BFR MAC CE.
    2>else if UL-SCH resources are available for a new transmission and if the UL-SCH
      resources can accommodate the Truncated BFR MAC CE plus its subheader as a result
of
      LCP:
      3>instruct the Multiplexing and Assembly procedure to generate the Truncated BFR MAC
        CE.
    2>else:
      3>trigger the SR for SCell beam failure recovery for each SCell for which BFR has been
        triggered and not cancelled.

---

All BFRs triggered prior to MAC PDU assembly for beam failure recovery for an SCell may be cancelled when a MAC PDU is transmitted and this PTU includes a BFR MAC CE or Truncated BFR MAC CE which contains beam failure information of that SCell.

beamFailureInstanceMaxCount, beamFailureDetectionTimer, beamFailureRecoveryTimer for the beam failure recovery procedure are specific to serving cell. BFI_COUNTER is maintained separately for each serving cell configured with beam failure detection.

The MAC CEs for BFR comprises either:
BFR MAC CE; or
Truncated BFR MAC CE.

FIGS. 1 and 2 illustrate examples of a BFR MAC CE format according to an embodiment of the present disclosure.

FIG. 1 illustrates a BFR MAC CE and Truncated. BFR MAC CE with the highest ServCellIndex of the MAC entity's SCell configured with BFD is less than 8.

FIG. 2 illustrates a BFR MAC CE and Truncated BFR MAC CE with the highest ServCellIndex of the MAC entity's SCell configured with BFI is equal to or higher than 8.

The BFR MAC CE and Truncated BFR MAC CE may be identified by a MAC subheader with LCID/eLCID.

The BFR MAC CE and Truncated BFR MAC CE may have a variable size. They include a bitrnap and in ascending order based on the ServCellIndex, beam failure recovery information i.e., octets containing candidate beam availability indication (AC) for SCells indicated in the bitmap. For BFR MAC CE, a single octet bitmap may be used when the highest ServCellIndex of this MAC entity's SCell for which beam failure is detected is less than 8, otherwise four octets may be used. A MAC PDU may contain at most one BFR MAC CE.

For Truncated BFR MAC CE, a single octet bitmap may be used for the following cases, otherwise four octets may be used:

the highest ServCellIndex of this MAC entity's SCell for which beam failure is detected is less than 8; or beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs may be defined as follows:

SP: This field indicates beam failure detection for the SpCell of this MAC entity. The SP field is set to 1 to indicate that beam failure is detected for SpCell only when BFR MAC CE or Truncated BFR MAC CE is to be included into a MAC PDU as part of random access procedure, otherwise, it is set to 0;

$C_i$(BFR MAC CE): This field indicates beam failure detection and the presence of an octet containing the AC field for the SCell with ServCellIndex i. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present for the SCell with ServCellIndex i. The octets containing the AC field are present in ascending order based on the ServCellIndex;

$C_i$(Truncated BFR MAC CE): This field indicates beam failure detection for the SCell with ServCellIndex i. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present for the SCell with SenCellIndex i. The octets containing the AC field, if present, are included in ascending order based on the ServCellIndex. The number of octets containing the AC field included is maximized, while not exceeding the available grant size;

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateReamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-thresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits; and R: Reserved bit, set to 0.

A serving cell can support multiple transmission/reception points (TRPs) and a UE can be served with multiple TRPs concurrently for improved data rate and reliability. In the current design, beam failure detection and recovery is per serving cell; List of BFD RSs may be signaled per serving cell and Candidate beam RS list is signaled per serving cell.

BFD/BFR procedure is being enhanced to support multi TRP BFD/BFR. There can be up to two TRPs in a serving cell. BFD/BFR is performed per TRP. Separate BFD-RS set and candidate beam list for each TRP is signalled by a gNB. BFI_COUNTER is maintained separately for each TRP of serving cell.

A beam failure is detected for a TRP of a serving cell if number of consecutive detected beam failure instance for the TRP exceeds a configured maximum number (beamFailureInstanceMaxCount) within a configured time (beamFailureDetectionTimer). beamFailureDetectionTimer and beamFailureInstanceMaxCount is configured/signalled by a gNB separately for each TRP of serving cell. A beam failure instance for a TRP means that hypothetical PDCCH BLER determined based on measurement of beam failure detection RS is above a threshold for all beam failure detection RSs in BFD-RS set of the TRP. Upon beam failure instance for a TRP, lower layer i.e., sends indication to MAC. MAC entity in a UE may perform the following operation for serving cell configured with multiple BFD-RS sets:

1>if the serving cell is configured with multiple BFD-RS sets, the MAC entity may for each BFD-RS set of this serving cell:
  2>if beam failure instance indication for a BFD-RS set has been received from lower layers:
    3>start or restart the beamFailureDetectionTimer corresponding to the BFD-RS set;
    3>increment BFI_COUNTER corresponding to the BFD-RS set by 1;
    3>if BFI_COUNTER corresponding to the BFD-RS set >=
      beamFailureInstanceMaxCount:
      4>trigger a BFR for this BFD-RS set of the serving cell;
  2> if BFR for both BFD-RS sets of the serving cell are triggered and pending (i.e., not
    cancelled or not successfully completed):
    3> if the serving cell is SpCell:
      4> initiate a random access procedure on the SpCell;
      4> if the initiated random access procedure is successfully completed:
       5> set BFI_COUNTER of each BFD-RS set of SpCell to 0.
  2>if the beamFailureDetectionTimer of this BFD-RS set expires; or
  2>if beamFailureDetectionTimer, beamFailureInstanceMaxCount, or any of the reference
    signals used for beam failure detection is reconfigured by upper layers associated with
    this BFD-RS set of the serving cell:
    3>set BFI_COUNTER corresponding to the BFD-RS set to 0.
  2>if a PDCCH addressed to C-RNTI indicating uplink grant for a new transmission is
    received for the HARQ process used for the transmission of the Enhanced BFR MAC CE
    or truncated enhanced BFR MAC CE which contains beam failure recovery information
    of this BFD-RS set of the serving cell; or
  2>if the SCell is deactivated as specified in clause 5.9:
    3>set BFI_COUNTER corresponding to the BFD-RS set to 0;
1>if the beam failure recovery procedure determines that at least one BFR for BFD-RS set has
  been triggered and not cancelled for an SCell for which evaluation of the candidate beams
  according to the requirements as specified in TS 38.133 has been completed; or
1> if the beam failure recovery procedure determines that at least one BFR for BFD-RS set for
  only one BFD-RS set has been triggered and not cancelled for an SpCell for which evaluation
  of the candidate beams according to the requirements as specified in TS 38.133 has been
  completed:
  2>if UL-SCH resources are available for a new transmission and if the UL-SCH resources
    can accommodate the Enhanced BFR MAC CE plus its sub header as a result of LCP:
    3>instruct the Multiplexing and Assembly procedure to generate the Enhanced BFR MAC
      CE.
  2>else if UL-SCH resources are available for a new transmission and if the UL-SCH
    resources can accommodate the truncated enhanced BFR MAC CE plus its sub header as
    a result of LCP:
    3>instruct the Multiplexing and Assembly procedure to generate the truncated enhanced
      BFR MAC CE.
  2>else:
    3>trigger the SR for beam failure recovery of each BFD-RS set for which BFR has been
      triggered, not cancelled, and for which evaluation of the candidate beams according to
      the requirements as specified in TS 38.133 has been completed.

FIG. 3 illustrates an example of beam failure detection (BFD) and BFR for TRPs according to an embodiment of the present disclosure.

Referring to FIG. 3, if all beams of a TRP fails, beam failure is not detected and hence one or more TRP(s) cannot serve the UE until all TRPS fail and recovery is initiated.

All BFRs ttiggered for an SCell may be cancelled when a MAC PDU is transmitted and this PDU includes a BFR MAC CE or Truncated BFR MAC CE which contains beam failure information of that SCell. All BFRs triggered for a BFD-RS set of an SCell may be cancelled when a MAC PDU is transmitted and this PDU includes an Enhanced BFR MAC CE or truncated enhanced BFR MAC CE which contains beam failure recovery information of that BFD-RS set of the SCell.

According to the above procedure, enhanced BM MAC CE is transmitted upon BFD for a BFD-RS set of serving cell. For BFR of a BFD-RS set of serving cell, enhanced BFR MAC CE may include following information for the failed TRP: candidate beam is available or not; Candidate beam information, if available; identity of failed. TRP. In case of BFD on both the TRPs of a serving cell, information about both TRPs needs to be included. The issue is how to efficiently encode the information considering that sometime one TRP is failed and sometime both TRPs are failed for a serving cell so that overhead is minimized.

Method 1

Multiple transmission reception points (TRP) can be there in a serving cell. BFD/BFR may be performed per TRP, In a serving cell supporting multiple TRPs separate BFD-RS set (or list of BFD-RSs) and separate candidate beam list for each TRP may signalled by a gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signalled by the gNB separately for each TRP (i.e., BFD-RS set) of serving cell. A Beam failure instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer i.e., PHY sends indication to MAC indicating beam failure instance for the TRP (i.e., the BFD-RS set). MAC entity in the LE may perform the following operation for each serving cell configured with multiple TRPs i.e., BFD-RS sets:

The MAC entity may for each serving cell configured for beam failure detection:

1>if the serving cell is configured with multiple BFD-RS sets, the MAC entity may for each BFD-RS set of this serving cell:
    2>if beam failure instance indication for a BFD-RS set has been received from lower layers:
        3>start or restart the beamFailureDetectionTimer corresponding to the BFD-RS set;
        3>increment BFI_COUNTER, corresponding to the BFD-RS set by 1;
        3>if BFI_COUNTER corresponding to the BFD-RS set >=
          beamFailureInstanceMaxCount:
          4> trigger a BFR for this BFD-RS set of the serving cell;
    2> if BFR for both BFD-RS sets of the serving cell are triggered and pending (i.e., not cancelled or not successfully completed for any of the BFD-RS set of the serving cell):
        3> if the serving cell is SpCell:
          4> initiate a random access procedure on the SpCell;
          4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case, the UE may RA procedure and cancel the pending SR).
  2> if the random access procedure initiated triggered by BFR for both BFD-RS sets of the SpCell is successfully completed:
        3> set BFI_COUNTER of each BFD-RS set of SpCell to 0.
        3> beam failure recovery procedure is successfully completed.
    2>if the beamFailureDetectionTimer of this BFD-RS set expires; or
    2>if beamFailureDetectionTimer, beamFailureInstanceMaxCount, or any of the reference signals used for beam failure detection is reconfigured by upper layers associated with this BFD-RS set of the serving cell:
        3>set BFI_COUNTER corresponding to the BFD-RS set to 0.
    2>if a PDCCH addressed to C-RNTI indicating uplink grant for a new transmission is received for the HARQ process used for the transmission of the Enhanced BFR MAC CE or truncated enhanced BFR MAC CE which contains beam failure recovery information of this BFD-RS set of the serving cell; or
    2>if the SCell is deactivated as specified in clause 5.9:
        3>set BFI_COUNTER corresponding to the BFD-RS set to 0;
1>if the beam failure recovery procedure determines that at least one BFR for BFD-RS set has been triggered and not cancelled for an SCell for which evaluation of the candidate beams has been completed; or
1> if the beam failure recovery procedure determines that at least one BFR for BFD-RS set for only one BFD-RS set has been triggered and not cancelled for an SpCell for which evaluation of the candidate beams has been completed:
    2>if UL-SCH resources are available for a new transmission and if the UL-SCH resources can accommodate the Enhanced BFR MAC CE plus its sub header as a result of LCP:
        3>instruct the Multiplexing and Assembly procedure to generate the Enhanced BFR MAC CE.
    2>else if UL-SCH resources are available for a new transmission and if the UL-SCH resources can accommodate the truncated enhanced BFR MAC CE plus its sub header as a result of LCP:
        3>instruct the Multiplexing and Assembly procedure to generate the truncated enhanced BFR MAC CE.

-continued

```
2>else:
    3> trigger the SR for beam failure recovery of each BFD-RS set for which BFR has been
        triggered, not cancelled, and for which evaluation of the candidate beams has been
        completed.
```

Figure 4:
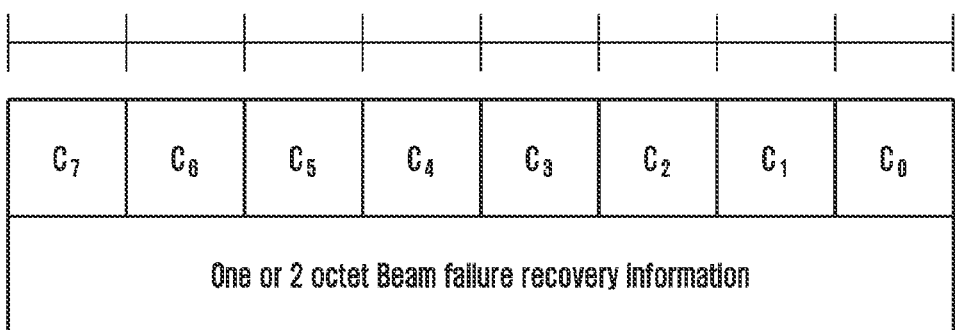
FIG. 4 illustrates an example of an enhanced BFR MAC CE format for multi TRP BFR according to an embodiment of the present disclosure.

In an embodiment as per this method of disclosure, Enhanced BFR MAC CE formats are illustrated in FIG. 4, FIG. 5, and FIG. 6.

FIGS. 4 and 5 illustrate examples of an enhanced BFR MAC CE format according to an embodiment of the present disclosure. FIG. 6 illustrates an example of beam failure recovery information according to an embodiment of the present disclosure.

The first enhanced BFR MAC CE format (as illustrated in FIG. 4) comprises one octet bitmap, where each bit corresponds to a serving cell. The second enhanced BFR MAC CE format (as illustrated in FIG. 5) comprises four octets bitmap, where each bit corresponds to a serving cell. The first enhanced BFR MAC CE format may be used when the highest ServCellIndex of this MAC entity's Scell for which beam failure is detected for at least one BFD-RS set and the evaluation of the candidate beams has been completed is less than 8, otherwise second enhanced BFR MAC CE format with four octets may be used. LCID used in MAC sub header of first enhanced BFR MAC CE format and second enhanced BFR MAC CE format may be also different. The LCID can be a 6 bit. The LCD can be an extended LCID of 8 bit or 16 bit length.

In the first and second enhanced MAC CE formats, the field C0 (can also be named as SP) corresponds to SpCell. The C0 field indicates beam failure detection and the presence of beam failure recovery information of SpCell. The C0 field set to 1 indicates that beam failure is detected for at least one TRP (i.e., BFD-RS set) of SpCell and the beam failure recovery information of failed TRP(s) (i.e., BFD-RS set (s) for which beam failure is detected and candidate beam evaluation is completed) of SpCell is present. The C0 field set to 0 indicates that beam failure is not detected for any TRP (i.e., BFD-RS set) of SpCell or beam failure is detected but candidate beam evaluation is not completed for any TRP (i.e., BFD-RS set) of SpCell, in this case the beam failure recovery information is not present for SpCell (i.e., for any TRP of SpCell).

In the first and second enhanced BFR MAC CE formats, the Ci field (i>0) corresponds to the serving cell with serving cell index i. The Ci field indicates beam failure detection and the presence of beam failure recovery information of serving cell with serving cell index i. The $C_i$ field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of serving cell with serving cell index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set (s)) of serving cell with serving cell index i is not present.

In the first and second enhanced BFR MAC CE formats, the beam failure recovery information of serving cells are present in ascending order based on the serving cell index. Beam failure recovery information of SpCell is present before any other serving cell.

In the first and second enhanced BFR MAC CE formats. Beam failure recovery information for each serving cell may be one or two octets. One of the 6 types of beam failure recovery information formats (FIG. 6) may be included for a serving cell whose Ci/SP bit is set to 1. In the type 3-6, $1^{st}$ AC bit is for BFD-RS set 0 and $2^{nd}$ AC bit is for BFD-RS set 1, BFD RS set ID is not included. In the type 1-2, AC bit is for TRP (BFD-RS set) indicated by ID field (BFD-RS set ID, 0 or 1). F field indicates whether one TRP is failed or both TRPs are failed, F bit also indicates whether (AC, AC) or (AC, ID) are present in beam failure recovery information.

For serving cell if the corresponding Ci/SP bit is set to 1, a UE may include the F field in beam failure recovery information. F field is set to 0 if only one TRP of serving cell is failed (i.e., beam failure recovery is triggered for one BFD-RS set) or in other words if beam failure recovery information of only one TRP of serving cell is to be included in MAC CE. F field is set to 1 if both TRPs of serving cell have failed (i.e., beam failure recovery is triggered for both BFD-RS sets) or in other words if beam failure recovery information of both TRPs (or BFD-RS sets) of serving cell is to be included in MAC CE.

If the F field is set to 0, a UE may include one AC, field and one ID field. The ID field is set to BFD-RS set ID of the BFD-RS set for which beam failure is detected and recovery is being performed. AC field indicates presence of candidate RS ID field. AC field is set to 1, if a candidate beam is available (i.e., measured RSRP of one of the candidate RSs (SSBs/CSIRSs) in candidate beam RS list corresponding to the failed TRP i.e., BFD-RS set) for the failed TRP i.e., BFD-RS set. Otherwise, the AC field is set to 0. If AC field is set to 1, candidate RS ID field may be included and set to index of an SSB with SS-RSRP above threshold amongst the SSBs in candidate beam RS list corresponding to failed TRP i.e., RFD-RS set or to the index of a CSI-RS with CSI-RSRP above threshold amongst the CSI-RSs in candidate beam RS list corresponding to failed TRP i.e., BFD-RS set, reserved bits may be also included to octet align the beam failure recovery information. Candidate RSs in candidate beam list corresponding to a TRP i.e., BFD-RS set are sequentially indexed from 0. If AC field is set to 0, candidate RS ID field is not included and reserved bits are included to octet align the beam failure recovery information. If F field is set to 0 and AC field is set to 0, beam failure recovery information may be one octet. If F field is set to 0 and AC field is set to 1, beam failure recovery information may be two octets (if candidate RS ID field size is >5 bits), beam failure recovery information may be one octet (if candidate RS ID field size is >=5 bits).

If the F field is set to 1, a UE may include two AC, fields and ID field is not included $1^{st}$ AC bit is for BFD-RS set 0 and $2^{nd}$ AC bit is for BFD-RS set 1. AC field indicates presence of candidate RS ID field. AC field is set to 1, if candidate beam is available (i.e., measure RSRP of one of the candidate RSs (SSBs/CSIRSs) in candidate beam RS list corresponding to the failed TRP i.e., BFD-RS set) for the failed TRP BFD-RS set. Otherwise, the AC field is set to 0.

If first AC bit is set to 1 and second AC bit is set to 0, one candidate RS ID field may be included and it corresponds to 1$^{st}$ TRP i.e., for BFD RS set ID 0. If first AC bit is set to 0 and second AC bit is set to 1, one candidate RS ID field may be included and it corresponds to 2$^{nd}$ TRP i.e., for BFD RS set ID 1. In these cases, beam failure recovery information may be two octets (if candidate RS ID field size is >5 bits), beam failure recovery information may be one octet (if candidate RS ID field size is >=5 bits).

If first AC bit is set to 1 and second AC bit is set to 1, two candidate RS ID fields may be included, first candidate RS ID field corresponds to 1$^{st}$ TRP i.e., BFD-RS set 0, second candidate RS ID field corresponds to 2$^{nd}$ TRP i.e., for BFD RS set ID 1. In this case, beam failure recovery information may be two octets.

If first AC bit is set to 0 and second AC bit is set to 0, candidate RS ID field is not included In this case, beam failure recovery information may be one octet.

Method 2

Multiple transmission reception points (TRP) can be there in a serving cell. BFD/BFR is performed per TRP. In a serving cell supporting multiple TRPS, separate BFD-RS set (or BFD-RSs) and separate candidate beam list for each TRP may be signalled by a gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signalled by the gNB separately for each TRP (i.e., BFD-RS set) of serving cell. A beam failure instance for a TRP BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer i.e., PHY sends indication to MAC indicating beam failure instance for the TRP (i.e., the BFD-RS set). MAC entity in the UE may perform the following operation for each serving cell configured with multiple TRPs i.e., BFD-RS sets:

The MAC entity may for each serving cell configured for beam failure detection:

1>if the serving cell is configured with multiple BFD-RS sets, the MAC entity may for each BFD-RS set of this serving cell:
  2>if beam failure instance indication for a BFD-RS set has been received from lower layers:
    3>start or restart the beamFailureDetectionTimer corresponding to the BFD-RS set;
    3>increment BFI_COUNTER corresponding to the BFD-RS set by 1;
    3>if BFI_COUNTER, corresponding to the BFD-RS set >= beamFailureInstanceNIaxClount:
      4>trigger a BFR for this BFD-RS set of the serving cell;
  2> if BFR for both BFD-RS sets of the serving cell are triggered and pending (i.e., not cancelled or not successfully completed for any of the BFD-RS set of the serving cell):
    3> if the serving cell is SpCell:
      4> initiate a random access procedure on the SpCell;
      4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case, the UE may perform RA procedure and cancel the pending SR).
  2> if the random access procedure initiated triggered by BFR for both BFD-RS sets of the SpCell is successfully completed:
    3> set BFI_COUNTER of each BFD-RS set of SpCell to 0.
    3> beam failure recovery procedure is successfully completed.
  2>if the beamFailureDetectionTimer of this BFD-RS set expires; or
  2>if beamFailureDetectionTimer, beamFailureInstanceMaxCount, or any of the reference signals used for beam failure detection is reconfigured by upper layers associated with this BFD-RS set of the serving cell:
    3>set BFI_COUNTER corresponding to the BFD-RS set to 0.
  2>if a PDCCH addressed to C-RNTI indicating uplink grant for a new transmission is received for the HARQ process used for the transmission of the Enhanced BFR MAC CE or truncated enhanced BFR MAC CE which contains beam failure recovery information of this BFD-RS set of the serving cell; or
  2>if the SCell is deactivated as specified in clause 5.9:
    3>set BFI_COUNTER corresponding to the BFD-RS set to 0;
1>if the beam failure recovery procedure determines that at least one BFR for BFD-RS set has been triggered and not cancelled for an SCell for which evaluation of the candidate beams has been completed; or
2> if the beam failure recovery procedure determines that at least one BFR for BFD-RS set for only one BFD-RS set has been triggered and not cancelled for an SpCell for which evaluation of the candidate beams has been completed:
  2>if UL-SCH resources are available for a new transmission and if the UL-SCH resources can accommodate the Enhanced BFR MAC CE plus its sub header as a result of LCP:
    3>instruct the Multiplexing and Assembly procedure to generate the Enhanced BFR MAC CE.
  2>else if UL-SCH resources are available for a new transmission and if the UL-SCH resources can accommodate the truncated enhanced BFR MAC CE plus its sub header as a result of LCP:
    3>instruct the multiplexing and assembly procedure to generate the truncated enhanced BFR MAC CE.

-continued

---

2>else:
    3> trigger the SR for beam failure recovery of each BFD-RS set for which BFR has been
      triggered, not cancelled, and for which evaluation of the candidate beams has been
      completed.

---

In an embodiment as per this method of disclosure, Enhanced BFR MAC CE formats are illustrated in FIG. 4, FIG. 5, and FIG. 7. FIG. 7 illustrates an example of beam failure recovery information according to an embodiment of the present disclosure.

The first enhanced BFR MAC CE format (as illustrated in FIG. 4) comprises one octet bitmap, where each bit corresponds to a serving cell. The second enhanced BFR MAC CE format (as illustrated in FIG. 5) comprises four octets bitmap, where each bit corresponds to a serving cell. The first enhanced BFR MAC CE format may be used when the highest ServCellIndex of this MAC entity's SCell for which beam failure is detected for at least one BFD-RS set and the evaluation of the candidate beams has been completed is less than 8, otherwise second enhanced BFR MAC CE format with four octets may be used. LCID used in MAC sub header of first enhanced BFR MAC CE format and second enhanced BFR MAC CE format is also different. The LCID can be a 6 bit. The LCID can be an extended LCID of 8 bit or 16-bit length.

In the first and second enhanced BFR MAC CE formats, the field C0 (can also be named as SP) corresponds to SpCell. The C0 field indicates beam failure detection and the presence of beam failure recovery information of SpCell. The C0 field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of SpCell is present. The C0 field set to 0 indicates that beam failure is not detected for any TRP (i.e., BFD-RS set) or beam failure is detected but candidate beam evaluation is not completed for any TRP (i.e., BFD-RS set), in this case the beam failure recovery information is not present for SpCell.

In the first and second enhanced BFR MAC CE formats, the Ci field (i>0) corresponds to the serving cell with serving cell index i. The Ci field indicates beam failure detection and the presence of beam failure recovery information of serving cell with serving cell index i. The $C_i$ field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of serving cell with serving cell index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed. TRP(s) (i.e., BFD-RS set (s)) of serving cell with serving cell index i is not present.

In the first and second enhanced BFR MAC CE formats, the beam failure recovery information of serving cells may be present in ascending order based on the serving cell index. Beam failure recovery information of SpCell is present before any other serving cell.

In the first and second enhanced BFR MAC CE formats, Beam failure recovery information for each serving cell may be one or two octets.

For serving cell if the corresponding Ci/SP bit is set to 1, a UE may include the F field in beam failure recovery information. F field is set to 0 if only one TRP of serving cell is failed (i.e., beam failure recovery is triggered for one BFD-RS set) or in other words if beam failure recovery information of only one TRP of serving cell is to be included in MAC CE. F field is set to 1 if both TRPs of serving cell have failed (i.e., beam failure recovery is triggered for both BFD-RS sets) or in other words if beam failure recovery information of both TRPs (or BFD-RS sets) of serving cell is to be included in MAC CE.

If the F field is set to 0, a UE may include ID field and candidate RS ID field. The ID field is set to BFD-RS set ID of the BFD-RS set for which beam failure is detected and recovery is being performed. The UE may also include candidate RS ID field. If candidate beam is available (i.e., measured RSRP of one of the candidate RSs (SSBs/CSIRSs) in candidate beam RS list corresponding to the failed TRP i.e., BFD-RS set) for the failed TRP i.e., BM-RS set, candidate RS ID field is set to index of an SSB with SS-RSRP above threshold amongst the SSBs in candidate beam RS list corresponding to failed TRP i.e., BFD-RS set or to the index of a CSI-RS with CSI-RSRP above threshold amongst the CSI-RSs in candidate beam RS list corresponding to failed TRP i.e., BFD-RS set, reserved bits may be also included to octet align the beam failure recovery information. Candidate RSs in candidate beam list corresponding to a TRP i.e., BFD-RS set may be sequentially indexed from 1. If candidate beam is not available, candidate RS ID field is set to 0. Note that there is no AC field and candidate RS ID field indicates whether candidate beam is available or not.

If the F field is set to 1, a UE may include ID field, first candidate RS ID field and a second candidate RS ID field. The ID field is set to BFD-RS set ID of one of the BFD-RS set for which beam failure is detected and recovery is being performed. First candidate RS ID field corresponds to the BFD-RS set whose ID is indicated by the ID field. Second candidate RS ID field corresponds to the BFD-RS set whose ID is not indicated by the ID field. If candidate beam is available (i.e., measured RSRP of one of the candidate RSs (SSBs/CSIRSs) in candidate beam RS list corresponding to the failed TRP i.e., BFD-RS set) for the failed TRP i.e., BFD-RS set, corresponding candidate RS ID field is set to index of an SSB with SS-RSRP above threshold amongst the SSBs in candidate beam RS list corresponding to failed TRP i.e., BFD-RS set or to the index of a CSI-RS with CSI-RSRP above threshold amongst the CSI-RSs in candidate beam RS list corresponding to failed TRP i.e., BFD-RS set, reserved bits are also included to octet align the beam failure recovery information. Candidate RSs in candidate beam list corresponding to a TRP i.e., BFD-RS set may be sequentially indexed from 1. If a candidate beam is not available for a BFD-RS set, corresponding candidate RS ID field is set to 0. Note that there is no AC field and candidate RS ID field indicates whether candidate beam is available or not. In an embodiment, BFD-RS set of both TRPs can be included in case F is set to 1 as illustrated in FIG. 8.

Method 3

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP may be signalled by a gNB. BFD-RS set refers to BFD-RSs which the LT measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMax-Count is configured/signalled by tine gNB separately for each TRP (i.e., BFD-RS set) of serving cell. A beam failure instance for a TRP means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer i.e., PRY sends indication to MAC indicating beam failure instance for the TRP (i.e., the BFD-RS set). MAC entity in the UE may perform the following operation for each serving cell configured with multiple TRPs i.e., BFD-RS sets:

The MAC entity may for each serving cell configured for beam failure detection:

1>if the serving cell is configured with multiple BFD-RS sets, the MAC entity may for each BFD-RS set of this serving cell:
  2>if beam failure instance indication for a BFD-RS set has been received from lower layers:
    3>start or restart the beamFailureDetectionTimer corresponding to the BFD-RS set;
    3>increment BFI_COUNTER corresponding to the BFD-RS set by 1;
    3>if BFI_COUNTER corresponding to the BFD-RS set >= beamFailureInstanceMaxCount:
      4>trigger a BFR for this BFD-RS set of the serving cell;
  2> if BFR for both BFD-RS sets of the serving cell are triggered and pending (i.e., not cancelled or not successfully completed for any of the BFD-RS set of the serving cell):
    3> if the serving cell is SpCell:
      4> initiate a random access procedure on the SpCell;
      4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case, the UE may perform RA procedure and cancel the pending SR).
  2> if the random access procedure initiated triggered by BFR for both BFD-RS sets of the SpCell is successfully completed:
    3> set BFI_COUNTER of each BFD-RS set of SpCell to 0.
    3> beam failure recovery procedure is successfully completed.
  2> if the beamFailureDetection Timer of this BFD-RS set expires; or
  2>if beamFailureDetectionTimer, beamFailureInstanceMaxCount, or any of the reference signals used for beam failure detection is reconfigured by upper layers associated with this BFD-RS set of the serving cell:
    3>set BFI_COUNTER corresponding to the BFD-RS set to 0.
  2>if a PDCCH addressed to C-RNTI indicating uplink grant for a new transmission is received for the HARQ process used for the transmission of the Enhanced BFR MAC CE or truncated enhanced BFR MAC CE which contains beam failure recovery information of this BFD-RS set of the serving cell; or
  2>if the SCell is deactivated as specified in clause 5.9:
    3>set BFI_COUNTER corresponding to the BFD-RS set to 0;
1>if the beam failure recovery procedure determines that at least one BFR for BFD-RS set has been triggered and not cancelled for an SCell for which evaluation of the candidate beams has been completed; or
3> if the beam failure recovery procedure determines that at least one BFR for BFD-RS set for only one BFD-RS set has been triggered and not cancelled for an SpCell for which evaluation of the candidate beams has been completed:
  2>if UL-SCH resources are available for a new transmission and if the UL-SCH resources can accommodate the Enhanced BFR MAC CE plus its sub header as a result of LCP:
    3>instruct the Multiplexing and Assembly procedure to generate the Enhanced BFR MAC CE.
  2>else if UL-SCH resources are available for a new transmission and if the UL-SCH resources can accommodate the truncated enhanced BFR MAC CE plus its sub header as a result of LCP:
    3>instruct the Multiplexing and Assembly procedure to generate the truncated enhanced BFR MAC CE.
  2>else:
    3> trigger the SR for beam failure recovery of each BFD-RS set for which BFR has been triggered, not cancelled, and for which evaluation of the candidate beams has been completed.

Figure 9:
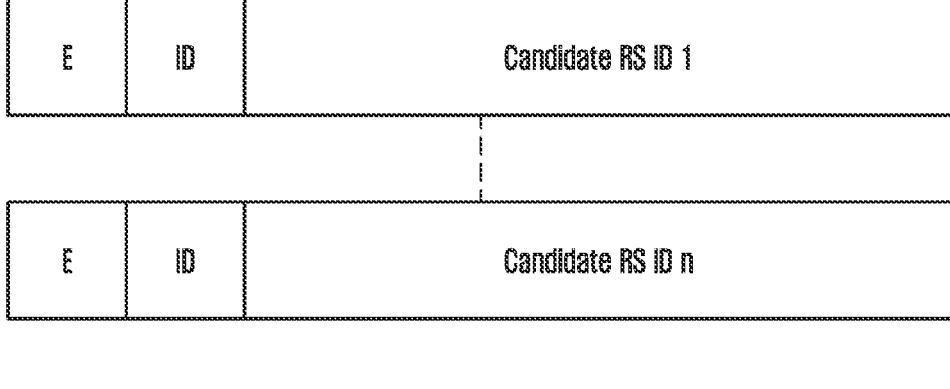
FIG. 9 illustrates an example of beam failure recovery information according to an embodiment of the present disclosure.

In an embodiment as per this method of disclosure, Enhanced BFR MAC CE formats are illustrated in FIG. 4, FIG. 5, and FIG. 9. FIG. 9 illustrates an example of beam failure recovery information according to an embodiment of the disclosure.

The first enhanced BFR MAC CE format (as illustrated in FIG. 4) comprises one octet bitmap, where each bit corresponds to a serving cell. The second enhanced BFR MAC CE format (as illustrated in FIG. 5) comprises four octets bitmap, where each bit corresponds to a serving cell. The first enhanced BFR MAC CE format may be used when the highest ServCellIndex of this MAC entity's Scell for which beam failure is detected for at least one BFD-RS set and the evaluation of the candidate beams has been completed is less than 8, otherwise second enhanced BFR MAC CE format with four octets may be used. LCID used in MAC sub header of first enhanced BFR MAC CE format and second enhanced BFR MAC CE format may be also different. The LCID can be a 6 bit. The LCID can be an extended LCID of 8 bit or 16-bit length.

In the first and second enhanced BFR MAC CE formats, the field C0 (can also be named as SP) corresponds to SpCell. The C0 field indicates beam failure detection and the presence of beam failure recovery information of SpCell. The C0 field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of SpCell is present. The C0 field set to 0 indicates that beam failure is not detected for any TRP (i.e., BFD-RS set) or beam failure is detected but candidate beam evaluation is not completed for any TRP (i.e., BFD-RS set), in this case the beam failure recovery information is not present for SpCell.

In the first and second enhanced BFR MAC CE formats, the Ci field (i>0) corresponds to the serving cell with serving cell index i. The Ci field indicates beam failure detection and the presence of beam failure recovery information of serving cell with serving cell index i. The $C_i$ field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of serving cell with serving cell index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set (s)) of serving cell with serving cell index i is not present.

In the first and second enhanced BFR MAC CE formats, the beam failure recovery information of serving cells are present in ascending order based on the serving cell index. Beam failure recovery information of SpCell is present before any other serving cell.

In the first and second enhanced BFR MAC CE formats, Beam failure recovery information for each serving cell may be up to P octets where P is the number of TRPs (BFD-RS sets) in a serving cell.

For serving cell if the corresponding Ci/SP bit is set to 1, a UE may include one octet beam failure recovery information (as illustrated in FIG. 9) comprising 1 bit E field, ID field and candidate RS ID field for each failed TRP (BFD-RS set ID). E field is set to 0 in the octet corresponding to the last TRP (BFD-RS set) whose information is included. Otherwise, E field is set to 1. E field is set to 1 in an octet corresponding to a TRP (BFD-RS set) of a serving cell indicates that another octet for another TRP (BFD-RS set) of same serving cell follows this octet.

The ID field is set to BFD-RS set ID of the BFD-RS set for which beam failure is detected and recovery is being performed. The UE may also include candidate RS ID field. If candidate beam is available (i.e., measured RSRP of one of the candidate RSs (SSBs/CSIRSs) in candidate beam RS list corresponding to the failed TRP i.e., BFD-RS set) for the failed TRP i.e., BFD-RS set, candidate RS ID field is set to index of an SSB with SS-RSRP above threshold amongst the SSBs in candidate beam RS list corresponding to failed TRP i.e., BFD-RS set or to the index of a CSI-RS with CSI-RSRP above threshold amongst the CSI-RDs in candidate beam RS list corresponding to failed TRP i.e., BFD-RS set, reserved bits may be also included to octet align the beam failure recovery information. Candidate RSs in candidate beam list corresponding to a TRP i.e., BFD-RS set may be sequentially indexed from 1. If candidate beam is not available, candidate RS ID field is set to 0. Note that there is no AC field and candidate RS ID field indicates whether candidate beam is available or not.

Method 4

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP may be signalled by a gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamfailureInstanceMaxCount) within a configured time (beamFailureDetectionTimer). beamFailureDetectionTimer and beamFailureInstanceMax-Count is configured/signalled by the gNB separately for each TRP (i.e., BFD-RS set) of serving cell. A beam failure instance for a TRP BFD-RS set) means that hypothetical PDCCH BLER determined based on measurement of beam failure detection RS is above a threshold for all beam failure detection RSs of the TRP BFD-RS set). Upon beam failure instance for a TRP, lower layer i.e., PHY sends indication to MAC indicating beam failure instance for the TRP (i.e., the BFD-RS set). MAC entity in the UE may perform the following operation for each serving cell configured with multiple TRPs i.e., BFD-RS sets:

The MAC entity may for each serving cell configured for beam failure detection:

1>if the serving cell is configured with multiple BFD-RS sets, the MAC entity may for each BFD-RS set of this serving cell:
  2>if beam failure instance indication for a BFD-RS set has been received from lower layers:
    3>start or restart the beamFailureDetectionTimer corresponding to the BFD-RS set;
    3>increment BFI_COUNTER corresponding to the BFD-RS set by 1;
    3>if BFI_COUNTER corresponding to the BFD-RS set >= beamFailureInstanceMaxCount:
      4>trigger a BFR for this BFD-RS set of the serving cell;

-continued

```
    2> if BFR for both BFD-RS sets of the serving cell are triggered and pending (i.e., not
        cancelled or not successfully completed for any BFD-RS set of the serving cell):
        3> if the serving cell is SpCell:
            4> initiate a random access procedure on the SpCell;
            4> cancel the pending SR triggered for BFR of a BFD-RS set of SpCell and stop the
                corresponding sr-ProhibitTimer, if running. (Note that at time instance T1, BFR for
                one BFD-RS set is triggered and SR may be triggered if UL SCH resources are not
                available or if UL SCH resources are available but it cannot accommodate neither
                enhanced BFR MAC CE not truncated enhanced BFR MAC CE. Later at time
                instance T2, BFR for BFR for another BFD-RS set is triggered while the BFR for first
                BFD-RS set is still pending. In this case, the UE may perform RA procedure and
                cancel the pending SR).
    2> if the random access procedure initiated triggered by BFR for both BFD-RS sets of the SpCell is
successfully completed:
            3> set BFI_COUNTER of each BFD-RS set of SpCell to 0.
            3> beam failure recovery procedure is successfully completed.
    2>if the beamFailureDetectionTimer of this BFD-RS set expires; or
    2>if beamFailureDetectionTimer, beamFailureInstanceMaxCount, or any of the reference
        signals used for beam failure detection is reconfigured by upper layers associated with
        this BFD-RS set of the serving cell:
        3>set BFI_COUNTER corresponding to the BFD-RS set to 0.
    2>if a PDCCH addressed to C-RNTI indicating uplink grant for a new transmission is
        received for the HARQ process used for the transmission of the Enhanced BFR MAC CE
        or truncated enhanced BFR MAC CE which contains beam failure recovery information
        of this BFD-RS set of the serving cell; or
    2>if the SCell is deactivated as specified in clause 5.9:
        3>set BFI_COUNTER corresponding to the BFD-RS set to 0;
1>if the beam failure recovery procedure determines that at least one BFR for BFD-RS set has
    been triggered and not cancelled for an SCell for which evaluation of the candidate beams has
    been completed; or
4> if the beam failure recovery procedure determines that at least one BFR for BFD-RS set for
    only one BFD-RS set has been triggered and not cancelled for an SpCell for which evaluation
    of the candidate beams has been completed:
        2>if UL-SCH resources are available for a new transmission and if the UL-SCH resources
            can accommodate the Enhanced BFR MAC CE plus its sub header as a result of LCP:
        3>instruct the Multiplexing and Assembly procedure to generate the Enhanced BFR MAC
            CE.
        2>else if UL-SCH resources are available for a new transmission and if the UL-SCH
            resources can accommodate the truncated enhanced BFR MAC CE plus its sub header as
            a result of LCP:
        3>instruct the Multiplexing and Assembly procedure to generate the truncated enhanced
            BFR MAC CE.
        2>else:
        3> trigger the SR for beam failure recovery of each BFD-RS set for which BFR has been
            triggered, not cancelled, and for which evaluation of the candidate beams has been
            completed.
```

In an embodiment as per this method of disclosure, Enhanced BFR MAC CE formats are illustrated in FIG. 10, FIG. 11, and FIG. 12. FIG. 10 illustrates a one octet enhanced BFR MAC CE format for multi TRP BFR according to an embodiment of the disclosure. FIG. 11 illustrates a four octet enhanced BFR MAC CE format for multi TRP BFR according to an embodiment of the disclosure. FIG. 12 illustrates an example of beam failure recovery information according to an embodiment of the present disclosure.

The first enhanced BFR MAC CE format (as illustrated in FIG. 10) comprises one octet $C_i$ bitmap for identifying serving cell(s), where each bit corresponds to a serving cell. The second enhanced BFR MAC CE format (as illustrated in FIG. 11) comprises four octets $C_i$ bitmap for identifying serving cell(s), where each bit corresponds to a serving cell. The first enhanced BFR MAC CE format may be used when the highest SenCellIndex of this MAC entity's SCell for which beam failure is detected for at least one BFD-RS set and the evaluation of the candidate beams has been completed is less than 8, otherwise (i.e., if the highest ServCellIndex of this MAC entity's Spell for which beam failure is detected for at least one BFD-RS set and the evaluation of the candidate beams has been completed is not less than 8), second enhanced BFR MAC CE format with four octets may be used. LGID used in MAC sub header of first enhanced BFR MAC CE format and second enhanced BFR MAC CE format may be also different. The LCID can be a 6 bit. The LCID can be an extended LCID of 8 bit or 16-bit length.

In the first and second enhanced BFR MAC CE formats, the field C0 (can also be named as SP) corresponds to SpCell. The C0 field indicates beam failure detection and the presence of beam failure recovery information of SpCell. The C0 field set to 1 indicates that beam failure is detected for at least one TRP (i.e., BFD-RS set) of SpCell and the beam failure recovery information of failed TRP(s) (i.e., BFD-RS set (s) for which beam failure is detected and candidate beam evaluation is completed) of SpCell is present. The C0 field set to 0 indicates that beam failure is not detected for any TRP (i.e., BFD-RS set) or beam failure is detected but candidate beam evaluation is not completed for any TRP (i.e., BFD-RS set), in this case the beam failure recovery information is not present for SpCell.

In the first and second enhanced BFR MAC CE formats, the $C_i$ field ($i>0$) corresponds to the serving cell with serving cell index (SenCellIndex) i. The $C_i$ field indicates beam failure detection and the presence of beam failure recovery information of serving cell with serving cell index i. The $C_i$ field set to 1 indicates that beam failure is detected for at least one TRP (i.e., BFD-RS set) and the beam failure recovery information of failed TRP(s) (i.e., BFD-RS set (s)

for which beam failure is detected and candidate beam evaluation is completed) of serving cell with serving cell index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set (s)) of serving cell with serving cell index i is not present.

In the first enhanced BFR MAC CE format, one octet Si bitmap may be also included. Si indicates whether beam failure is detected for both TRPs (BED-RS sets) of serving cell and candidate beam evaluation is completed for both or not, for a serving cell with serving cell index i (or the $i^{th}$ serving cell for which SP/Ci bit is set to 1 and is configured with two BFD-RS sets). S0 corresponds to SpCell. In the second enhanced BFR MAC CE format, 4 octets Si bitmap may be also included. Si indicates whether beam failure is detected for both TRPs (BFD-RS sets) of serving cell and candidate beam evaluation is completed for both or not, for a serving cell with serving cell index i (or the serving cell for which SP/Ci bit is set to 1 and is configured with two BFD-RS sets). S0 corresponds to SpCell. If beam failure is detected for both BFD-RS sets of a serving cell and candidate beam evaluation is completed for both BFD-RS sets, Si bit corresponding to the serving cell is set to 1. Otherwise, it is set to 0.

In the first and second enhanced BFR MAC CE formats, the beam failure recovery information of serving cells may be present in ascending order based on the serving cell index. Beam failure recovery information of SpCell is present before any other serving cell.

In the first and second enhanced BFR MAC CE formats, Beam failure recovery information for each serving cell may be up to P octets where P is the number of TRPs (BFD-RS sets) in a serving cell.

For serving cell if the corresponding Ci/SP bit is set to 1 and Si bit is set to 0, a UE may include one octet beam failure recovery information (FIG. 12) comprising 1-bit AC field, ID field and candidate RS ID or R bits for failed TRP (BFD-RS set ID). For serving cell if the corresponding Ci/SP bit is set to 1 and Si bit is set to 1, the UE may include two octet beam failure recovery information (FIG. 12) where each octet comprising 1-bit AC field, ID field and candidate RS ID or R bits for a failed TRP (BFD-RS set ID). The ID field is set to BFD-RS set ID of the BFD-RS set for which beam failure is detected and recovery is being performed. If candidate beam is available (i.e., measured RSRP of one of the candidate RSs (SSBs/CSIRSs) in candidate beam RS list corresponding to the failed TRP BFD-RS set) for the failed TRP i.e., BFD-RS set, candidate RS ID field is set to index of an SSB with SS-RSRP above threshold amongst the SSBs in candidate beam RS list corresponding to failed TRP i.e., BFD-RS set or to the index of a CSI-RS with CSI-RSRP above threshold amongst the CSI-RSs in candidate beam RS list corresponding to failed TRP i.e., BFD-RS set, AC field is set to 1. If candidate beam is not available, AC field is set to 0 and instead of candidate RS ID field R bits are included which are set to 0s.

In an embodiment, if first and second enhanced BFR MAC CE is included in Msg3/MsgA of RA procedure initiated for BFR of both failed TRPs of SpCell, Si bitmap is not included in BFR MAC CE.

Method 5

Multiple transmission reception points (TRP) can be there in a serving cell. BFD/BFR is performed per TRP. In a serving cell supporting multiple TRPS, separate BFD-RS set (or BFD-RSs) and separate candidate beam list for each TRP may be signalled by a gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signalled by the gNB separately for each TRP (i.e., BFD-RS set) of serving cell. A beam failure instance for a TRP means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer i.e., PHY sends indication to MAC indicating beam failure instance for the TRP (i.e., the BFD-RS set). MAC entity in a UE may perform the following operation for each serving cell configured with multiple TRPs i.e., BFD-RS sets:

The MAC entity may for each serving cell configured for beam failure detection:

1>if the serving cell is configured with multiple BFD-RS sets, the MAC entity may for each BFD-RS set of this serving cell:
  2>if beam failure instance indication for a BFD-RS set has been received from lower layers:
    3>start or restart the beamFailureDetectionTimer corresponding to the BFD-RS set;
    3>increment BFI_COUNTER corresponding to the BFD-RS set by 1;
    3>if BFI_COUNTER corresponding to the BFD-RS set >= beamFailureInstanceMaxCount:
      4>trigger a BFR for this BFD-RS set of the serving cell;
  2> if BFR for both BFD-RS sets of the serving cell are triggered and pending (i.e., not cancelled or not successfully completed for any BFD-RS set of the serving cell):
    3> if the serving cell is SpCell:
      4> initiate a random access procedure on the SpCell;
      4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case, the UE may perform RA procedure and cancel the pending SR).
  2> if the random access procedure initiated triggered by BFR for both BFD-RS sets of the SpCell is successfully completed:
    3> set BFI_COUNTER of each BFD-RS set of SpCell to 0.
    3> beam failure recovery procedure is successfully completed.

-continued

```
      2>if the beamFailureDetectionTimer of this BFD-RS set expires; or
      2>if beamFailureDetectionTimer, beamFailureInstanceMaxCount, or any of the reference
         signals used for beam failure detection is reconfigured by upper layers associated with
         this BFD-RS set of the serving cell:
         3>set BFI_COUNTER corresponding to the BFD-RS set to 0.
      2>if a PDCCH addressed to C-RNTI indicating uplink grant for a new transmission is
         received for the HARQ process used for the transmission of the Enhanced BFR MAC CE
         or truncated enhanced BFR MAC CE which contains beam failure recovery information
         of this BFD-RS set of the serving cell; or
      2>if the SCell is deactivated as specified in clause 5.9:
         3>set BFI_COUNTER corresponding to the BFD-RS set to 0;
   1>if the beam failure recovery procedure determines that at least one BFR for BFD-RS set has
      been triggered and not cancelled for an Scell for which evaluation of the candidate beams has
      been completed; or
   5> if the beam failure recovery procedure determines that at least one BFR for BFD-RS set for
      only one BFD-RS set has been triggered and not cancelled for an SpCell for which evaluation
      of the candidate beams has been completed:
      2>if UL-SCH resources are available for a new transmission and if the UL-SCH resources
         can accommodate the Enhanced BFR MAC CE plus its sub header as a result of LCP:
         3>instruct the Multiplexing and Assembly procedure to generate the Enhanced BFR MAC
            CE.
      2>else if UL-SCH resources are available for a new transmission and if the UL-SCH
         resources can accommodate the truncated enhanced BFR MAC CE plus its sub header as
         a result of LCP:
         3>instruct the Multiplexing and Assembly procedure to generate the truncated enhanced
            BFR MAC CE.
      2>else:
         3> trigger the SR for beam failure recovery of each BFD-RS set for which BFR has been
            triggered, not cancelled, and for which evaluation of the candidate beams has been
            completed.
```

In an embodiment as per this method of disclosure, Enhanced BFR MAC CE formats are illustrated in FIG. 10, FIG. 11, and FIG. 12.

The first enhanced BFR MAC CE format (as illustrated in FIG. 10) comprises one octet Ci bitmap for identifying serving cell(s), where each bit corresponds to a serving cell. The second enhanced BFR MAC CE format (as illustrated in FIG. 11) comprises four octets Ci bitmap for identifying serving cell(s), where each bit corresponds to a serving cell. The first enhanced BFR MAC CE format may be used when the highest ServCellIndex of this MAC entity's SCell for which beam failure is detected for at least one BFD-RS set and the evaluation of the candidate beams has been completed is less than 8, otherwise (i.e., if the highest ServCellIndex of this MAC entity's SCell for which beam failure is detected for at least one BFD-RS set and the evaluation of the candidate beams has been completed is not less than 8) second enhanced BFR MAC CE format with four octets may be used. LCID used in MAC sub header of first enhanced BFR MAC CE format and second enhanced BFR MAC CE format is also different. The LCID can be a 6 bit. The LCID can be an extended LCID of 8 bit or 16-bit length.

In the first and second enhanced BFR MAC CE formats, the field C0 (can also be named as SP) corresponds to SpCell. The C0 field indicates beam failure detection and the presence of beam failure recovery information of SpCell. The C0 field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of SpCell is present. The C0 field set to 0 indicates that beam failure is not detected for any TRP (i.e., BFD-RS set) or beam failure is detected but candidate beam evaluation is not completed for any TRP (i.e., BFD-RS set), in this case the beam failure recovery information is not present for SpCell.

In the first and second enhanced BFR MAC CE formats, the Ci field (i>0) corresponds to the serving cell with serving cell index i. The Ci field indicates beam failure detection and the presence of beam failure recovery information of serving cell with serving cell index i. The $C_i$ field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of serving cell with serving cell index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set (s)) of serving cell with serving cell index i is not present.

In the first enhanced BFR MAC CE format, one octet Si bitmap may be also included. Si indicates whether beam failure is detected for both TRPs (BFD-RS sets) of serving cell and candidate beam evaluation is completed for both or not, for a serving cell with serving cell index i (or the i$^{th}$ serving cell for which SP/Ci bit is set to 1 and is configured with two BFD-RS sets). S0 corresponds to SpCell.

In the second enhanced BFR MAC CE format, up to 4 octets Si bitmap may be included. If total number of serving cells for which at least one TRP (i.e., BFD-RS set) is failed (and the corresponding candidate beam evaluation is completed) is <=8 (in other words total number of serving cells configured with multiple TRPs BFD-RS sets) for which SP/Ci field set to 1 is greater than 0 and less than 9, note that as explained earlier, SP/Ci field is set to 1 for a serving cell if at least one TRP (i.e., BFD-RS set) is failed and the corresponding candidate beam evaluation is completed), 1 octet Si bit map may be included. If total number of serving cells for which at least one TRP (i.e., BFD-RS set) is failed (and the corresponding candidate beam evaluation is completed) is >8 and <=16 (in other words total number of serving cells configured with multiple TRPs (i.e., BFD-RS sets) for which SP/Ci field set to 1 is greater than 8 and <=16), 2 octet Si bit map is included. If total number of serving cells for which at least one TRP is failed (and the corresponding candidate beam evaluation is completed) is >16 and <=24 (in other words total number of serving cells configured with multiple TRPs (i.e., BFD-RS sets) for which SP/Ci field set to 1 is greater than 16 and <=24), 3 octet Si bit map may be included. If total number of serving cells for which at least one TRP is failed (and the corresponding candidate beam evaluation is completed) is >24 and <=32 (in other words total number of serving cells configured with multiple TRPs (i.e., BFD-RS sets) for which SP/Ci field set to 1 is greater than 24 and <=32), 4 octet Si bit map may be included. Si corresponds to ith failed serving cell (i.e., serving cell for which SP/Ci field set to 1) in increasing order of serving cell index. serving cell index of SpCell is assumed to be zero. This approach can reduce the overhead of Si bitmap compared to method 4 wherein 4 octet Si bitmap is always included in second enhanced BFR MAC CE format.

Si corresponding a serving cell indicates whether beam failure is detected for both TRPs (BFD-RS sets) of that serving cell and candidate beam evaluation is completed for both or not. S0 corresponds to SpCell. If beam failure is detected for both BFD-RS sets of a serving cell and candidate beam evaluation is completed for both BFD-RS sets, Si bit corresponding to that serving cell is set to 1.

FIG. 13 illustrates an example of an enhanced BFR MAC CE format for multi TRP BFR according to an embodiment of the present disclosure.

Referring to FIG. 13, serving cells for which at least one TRP is failed are Serving cell with serving cell index 2, Serving cell with serving cell index 13, Serving cell with serving cell index 22 and Serving cell with serving cell index 31. Highest serving cell index is 31 (>8), so second enhanced BFR MAC CE with 4 octet Ci bitmap is used. Number of serving cell for which at least one TRP is failed is 4 (<=8), so one octet Si bit map is added. S0 corresponds to first failed serving cell i.e., with serving index 2. Si corresponds to second failed serving cell i.e., with serving index 13. S2 corresponds to third failed serving cell i.e., with serving index 22. S3 corresponds to fourth failed serving cell i.e., with serving index 31. S4 to S7 is ignored and is set to 0.

In the first and second enhanced BFR MAC CE formats, the beam failure recovery information of serving cells may be present in ascending order based on the serving cell index. Beam failure recovery information of SpCell is present before any other serving cell.

In the first and second enhanced BFR MAC CE formats, Beam failure recovery information for each serving cell may be up to P octets where P is the number of TRPs (BFD-RS sets) in a serving cell.

For serving cell if the corresponding Ci/SP bit is set to 1 and Si bit is set to 0, a UE may include one octet beam failure recovery information (as illustrated in FIG. 12) comprising 1-bit AC field, ID field and candidate RS ID or R bits for failed TRP (BFD-RS set ID). For serving cell if the corresponding Ci/SP bit is set to 1 and Si bit is set to 1, the UE includes two octet beam failure recovery information (as illustrated in FIG. 12) where each octet comprising 1-bit AC field, ID field and candidate RS ID or R bits for a failed TRP (BFD-RS set ID). The ID field is set to BFD-RS set ID of the BFD-RS set for which beam failure is detected and recovery is being performed. If candidate beam is available (i.e., measured RSRP of one of the candidate RSs (SSBs/CSIRSs) in candidate beam RS list corresponding to the failed TRP i.e., BFD-RS set) for the failed TRP i.e., BFD-RS set, candidate RS ID field is set to index of an SSB with SS-RSRP above threshold amongst the SSBs in candidate beam RS list corresponding to failed TRP i.e., BFD-RS set or to the index of a CSI-RS with CSI-RSRP above threshold amongst the CSI-RSs in candidate beam RS list corresponding to failed. TRP i.e., BFD-RS set, AC field is set to 1. If candidate beam is not available, AC field is set to 0 and instead of candidate RS ID field R bits are included which are set to 0s.

In an embodiment, if first and second enhanced BFR MAC CE is included in Msg3/MsgA of RA procedure initiated for BFR of both failed TRPs of SpCell, Si bitmap is not included in BFR MAC CE to reduce the overhead.

Method 6

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP may be signalled by a gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signalled by the gNB separately for each TRP BFD-RS set) of serving cell. A beam failure instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP, lower layer i.e., PHY sends indication to MAC indicating beam failure instance for the TRP (i.e., the BFD-RS set). MAC entity in the UE may perform the following operation for each serving cell configured with multiple TRPs i.e., BFD-RS sets:

The MAC entity may for each serving cell configured for beam failure detection:

---

1>if the serving cell is configured with multiple BFD-RS sets, the MAC entity may for each
   BFD-RS set of this serving cell:
     2>if beam failure instance indication for a BFD-RS set has been received from lower layers:
        3>start or restart the beamFailureDetectionTimer corresponding to the BFD-RS set;
        3>increment BFI_COUNTER corresponding to the BFD-RS set by 1;
        3>if BFI_COUNTER corresponding to the BFD-RS set >=
           beamFailureInstanceMaxCount:
           4>trigger a BFR for this BFD-RS set of the serving cell;
     2> if BFR for both BFD-RS sets of the seiwing cell are triggered and pending (i.e., not
       cancelled or not successfully completed):
       3> if the serving cell is SpCell:
          4> initiate a random access procedure on the SpCell;
          4> cancel the pending SR triggered for BFR of a BFD-RS set of SpCell and stop the -continued corresponding sr-ProhibitTimer, if running. (Note that at time instance T1, BFR for
one BFD-RS set is triggered and SR may be triggered if UL SCH resources are not
available or if UL SCH resources are available but it cannot accommodate neither
enhanced BFR MAC CE not truncated enhanced BFR MAC CE. Later at time
instance T2, BFR for BFR for another BFD-RS set is triggered while the BFR for first
BFD-RS set is still pending. In this case, the UE may perform RA procedure and
cancel the pending SR).
2> if the random access procedure initiated triggered by BFR for both BFD-RS sets of the SpCell is
successfully completed:
    3> set BFI_COUNTER of each BFD-RS set of SpCell to 0.
    3> beam failure recovery procedure is successfully completed.
    2>if the beamFailureDetectionTimer of this BFD-RS set expires; or
    2>if beamFailureDetectionTimer, beamFailureInstanceMaxCount, or any of the reference
      signals used for beam failure detection is reconfigured by upper layers associated with
      this BFD-RS set of the serving cell:
    3>set BFI_COUNTER corresponding to the BFD-RS set to 0.
    2>if a PDCCH addressed to C-RNTI indicating uplink grant for a new transmission is
      received for the HARQ process used for the transmission of the Enhanced BFR MAC CE
      or truncated enhanced BFR MAC CE which contains beam failure recovery information
      of this BFD-RS set of the serving cell; or
    2>if the SCell is deactivated as specified in clause 5.9:
    3>set BFI_COUNTER corresponding to the BFD-RS set to 0;
1>if the beam failure recovery procedure determines that at least one BFR for BFD-RS set has
  been triggered and not cancelled for an SCell for which evaluation of the candidate beams has
  been completed, or
6> if the beam failure recovery procedure determines that at least one BFR for BFD-RS set for
  only one BFD-RS set has been triggered and not cancelled for an SpCell for which evaluation
  of the candidate beams has been completed:
    2>if UL-SCH resources are available for a new transmission and if the UL-SCH resources
      can accommodate the Enhanced BFR MAC CE plus its sub header as a result of LCP:
    3>instruct the Multiplexing and Assembly procedure to generate the Enhanced BFR MAC
      CE.
    2>else if UL-SCH resources are available for a new transmission and if the UL-SCH
      resources can accommodate the truncated enhanced BFR MAC CE plus its sub header as
      a result of LCP:
    3>instruct the Multiplexing and Assembly procedure to generate the truncated enhanced
      BFR MAC CE.
    2>else:
    3> trigger the SR for beam failure recovery of each BFD-RS set for which BFR has been
      triggered, not cancelled, and for which evaluation of the candidate beams has been
      completed.

In an embodiment as per this method of disclosure, Enhanced BFR MAC CE formats are illustrated in FIG. 10, FIG. 11, and FIG. 12.

The first enhanced BFR MAC CE format (as illustrated in FIG. 10) comprises one octet Ci bitmap, where each bit corresponds to first TRP (i.e., BFD RS set 0) of a serving cell. The second enhanced BFR MAC CE format (as illustrated in FIG. 11) comprises four octets Ci bitmap for, where each bit corresponds to first TRP (i.e., BFD RS set 0) of a serving cell. The first enhanced BFR MAC CE format may be used when the highest ServCellIndex of this MAC entity's SCell for which beam failure is detected for at least one BFD-RS set and the evaluation of the candidate beams has been completed is less than 8, otherwise (i.e., if the highest ServCellIndex of this MAC entity's SCell for which beam failure is detected for at least one BFD-RS set and the evaluation of the candidate beams has been completed is not less than 8) second enhanced BFR MAC CE format with four octets may be used. LCID used in MAC sub header of first enhanced BFR MAC CE format and second enhanced BFR MAC CE format may be also different. The LCID can be a 6 bit. The LCID can be an extended LCID of 8 bit or 16-bit length.

In the first and second enhanced. BFR MAC CE formats, the field C0 (can also be named as SP) corresponds to SpCell. The C0 field indicates beam failure detection and the presence of beam failure recovery information of SpCell. The C0 field set to 1 indicates that beam failure is detected for 1st TRP (i.e., BFD-RS set ID 0) and the beam failure recovery information of first TRP (i.e., BFD-RS set 0 for which beam failure is detected and candidate beam evaluation is completed) of SpCell is present. The C0 field set to 0 indicates that beam failure is not detected for 1st TRP (i.e., BFD-RS set ID 0) or beam failure is detected but candidate beam evaluation is not completed for 1st TRP (i.e., BFD-RS set ID 0), in this case the beam failure recovery information is not present for 1st TRP BFD-RS set ID 0) in BFR MAC CEs.

In the first and second enhanced BFR MAC CE formats, the Ci field (i>0) corresponds to the 1st TRP (i.e., BFD-RS set ID 0), of serving cell with serving cell index i. The Ci field indicates beam failure detection and the presence of beam failure recovery information of 1st TRP (i.e., BFD-RS set ID 0) of serving cell with serving cell index i. The $C_i$ field set to 1 indicates that beam failure is detected for 1st TRP (i.e., BFD-RS set ID 0) and the beam failure recovery information of 1st TRP (i.e., BFD-RS set ID 0 for which beam failure is detected and candidate beam evaluation is completed) of serving cell with serving cell index i is present. The $C_i$ field set to 0 indicates that beam failure is not detected for 1st TRP (i.e., BFD-RS set ID 0) or beam failure is detected but candidate beam evaluation is not completed for 1st TRP (i.e., BFD-RS set ID 0), in this case the beam failure recovery information of for 1st TRP (i.e., BFD-RS set ID 0) of serving cell with serving cell index i is not present.

The first enhanced BFR MAC CE format (as illustrated in FIG. 10) comprises one octet Si bitmap, where each bit corresponds to second TRP (i.e., BFD RS set 1) of a serving cell. The second enhanced BFR MAC CE format (as illustrated in FIG. 11) comprises four octets Si bitmap, where each bit corresponds to second TRP (i.e., BFD RS set ID 1) of a serving cell.

In the first and second enhanced BFR MAC CE formats, the field S0 (can also be named as SP) corresponds to SpCell. The S0 field indicates beam failure detection and the presence of beam failure recovery information of SpCell. The S0 field set to 1 indicates that beam failure is detected for second TRP (i.e., BFD-RS set ID 1) and the beam failure recovery information of second TRP (i.e., BFD-RS set ID 1 for which beam failure is detected and candidate beam evaluation is completed) of SpCell is present. The S0 field set to 0 indicates that beam failure is not detected for second TRP (i.e., BFD-RS set ID 1) or beam failure is detected but candidate beam evaluation is not completed for second TRP (i.e., BFD-RS set ID 1), in this case the beam failure recovery information is not present for second TRP (i.e., BED-RS set ID 1) in BFR MAC CEs.

In the first and second enhanced BFR MAC CE formats, the Si field (i>0) corresponds to the second TRP (i.e., BFD-RS set ID 1), of serving cell with serving cell index i. The Si field indicates beam failure detection and the presence of beam failure recovery information of 2nd TRP (i.e., BFD-RS set ID 1) of serving cell with serving cell index i. The Si field set to 1 indicates that beam failure is detected for second TRP (i.e., BFD-RS set ID 1) and the beam failure recovery information of second TRP (i.e., BFD-RS set ID 1 for which beam failure is detected and candidate beam evaluation is completed) of serving cell with serving cell index i is present. The Si field set to 0 indicates that beam failure is not detected for second TRP (i.e., BFD-RS set ID 1) or beam failure is detected but candidate beam evaluation is not completed for second TRP (i.e., BFD-RS set ID 1), in this case the beam failure recovery information of for second TRP (i.e., BFD-RS set ID 1) of serving cell with serving cell index i is not present.

In the first and second enhanced BFR MAC CE formats, the beam failure recovery information of serving cells may be present in ascending order based on the serving cell index. Beam failure recovery information of SpCell is present before any other serving cell.

In the first and second enhanced BFR MAC CE formats, Beam failure recovery information for each serving cell may be up to P octets where P is the number of TRPs (BFD-RS sets) in a serving cell.

For serving cell if the corresponding Ci/SP hit is set to 1, a UE includes one octet beam failure recovery information (as illustrated in FIG. 12) comprising 1-bit AC field, ID field and candidate RS ID or R hits for $1^{st}$ failed TRP (BFD-RS set ID 0). For serving cell if the corresponding Si bit is set to 1, a UE may include one octet beam failure recovery information (e.g., FIG. 12) where each octet comprising 1-bit AC field, ID field and candidate RS ID or R bits for a $2^{nd}$ failed TRP (BFD-RS set ID 1). The ID field is set to BFD-RS set ID of the BFD-RS set for which beam failure is detected and recovery is being performed. If candidate beam is available (i.e., measured RSRP of one of the candidate RSs (SSBs/CSIRSs) in candidate beam RS list corresponding to the failed TRP i.e., BFD-RS set) for the failed TRP i.e., BFD-RS set, candidate RS ID field is set to index of an SSB with SS-RSRP above threshold amongst the SSBs in candidate beam RS list corresponding to failed TRP BFD-RS set or to the index of a CSI-RS with CSI-RSRP above threshold amongst the CSI-RSs in candidate beam RS list corresponding to failed TRP i.e., BFD-RS set, AC field is set to 1. If candidate beam is not available, AC field is set to 0 and instead of candidate RS ID field R bits are included which are set to 0s. If both Ci/SP bit and Si is set to 1 for a serving cell, one octet beam failure recovery information for both failed TRPs is included in MAC CE. Note that in one embodiment ID filed is not included (ID field in FIG. 12 is set to R bit) and in case both TRPs are failed for a serving cell, two octet beam failure recovery information may be included for serving cell, $1^{st}$ octet corresponds to beam failure recovery information of $1^{st}$ failed TRP and $2^{nd}$ octet corresponds to beam failure recovery information of 2nd failed TRP.

In an embodiment, if first and second enhanced BFR MAC CE is included in Msg3/MsgA of RA procedure initiated for BFR of both failed TRPs of SpCell, Si bitinap is not included in BFR MAC CE.

The description below may be common to the methods provided in the disclosure.

In addition to first and second enhanced BFR MAC CE format, third and fourth truncated enhanced BFR MAC CE format is supported.

The first enhanced BFR MAC CE format and the third truncated enhanced BFR MAC CE format may have same format except that in the third truncated enhanced BFR MAC CE format, if Ci bit is set to 1 for a serving cell index i, beam failure recovery information of serving cell may not be present (i.e., beam failure recovery information of any TRP of serving cell is not present) or partially present (i.e., in case both TRPs are failed, information about only one TRP may be included). Also, LCID used in MAC sub header of first enhanced BFR MAC CE format and third enhanced BFR MAC CE format may be also different.

The second enhanced BFR MAC CE format and the fourth truncated enhanced BFR MAC CE format may have same format except that in the fourth truncated enhanced BFR MAC CE format, if Ci bit is set to 1 for a serving cell index i, beam failure recovery information of serving cell may not be present (i.e., beam failure recovery information of any TRP of serving cell is not present) or partially present (i.e., in case both TRPs are failed, information about only one TRP may be included). Also, LCID used in MAC sub header of second enhanced BFR MAC CE format and fourth enhanced BFR MAC CE format may be also different.

LCID used in MAC sub header of third enhanced BFR MAC CE format and fourth enhanced BFR MAC CE format may be also different. The LCID can be a 6 bit. The LCID can be an extended LCID of 8 bit or 16-bit length. In an embodiment, eLCID is used in MAC sub header of both Enhanced BFR MAC CE and truncated enhanced BFR MAC CE. In an embodiment LCID is used in MAC sub header of both Enhanced BFR MAC CE and truncated enhanced BFR MAC CE. In an embodiment, eLCID is used in MAC sub header of Enhanced BFR MAC CE and LCID is used in in truncated enhanced BFR MAC CE. In an embodiment, LCID is used in MAC sub header if MAC CE is included in Msg3/msgA. Otherwise use eLCID.

The MAC subheader format for first enhanced BFR MAC CE format and/or second enhanced BFR MAC CE format and/or third truncated enhanced BFR MAC CE format and/or fourth truncated enhanced BFR MAC CE format, comprise one-bit R field set to 0, one-bit Format (F) field, 6 bit LCID field and length (L) field of 8 bits or 16 bits. LCID is the LCID reserved to indicate the specific BFR MAC CE format. A format field is set to 0 for 8-bit length field, and set to 1 for 16-bit length field.

Alternately the MAC subheader format for first enhanced BFR MAC CE format and/or second enhanced BFR MAC CE format and/or third truncated enhanced BFR MAC CE format and/or fourth truncated enhanced BFR MAC CE format, comprise one-bit R field set to 0, one-bit Format (F) field, 6 bit LCID field, eLCID field and length (L) field of 8 bits or 16 bits. In this case LCID is set to 34. eLCID is the LCID reserved to indicate the specific BFR MAC CE format. Format field is set to 0 for 8-bit length field, and set to 1 for 16-bit length field. Length of eLCID field is 8 bits.

A MAC PDU may contain at most one enhanced BFR MAC CE. However, note that if beam failure is detected for a serving cell X (and candidate beam evaluation is completed) which is not configured with multiple BFD-RS sets (i.e., TRPs) and beam failure is detected for at least one TRP for a serving cell Y (and candidate beam evaluation is completed) which is configured with multiple BFD-RS sets, both legacy BFR MAC CE and enhanced BFR MAC CE can be included in same MAC PDU where legacy BFR MAC CE includes beam failure recovery information for serving cell X and enhanced BFR MAC CE included beam failure recovery information of one or more TRPs of serving cell Y. Note that LCID used in a MAC sub header of legacy BFR MAC CE and enhanced BFR MAC CE is different, so that network can distinguish between these.

In an alternate embodiment, a UE can generate enhanced BFR MAC CE for both serving cell X and serving cell Y to reduce overhead. For serving cell X, in enhanced BFR MAC CE, Ci bit corresponding to serving cell X is set to 1, the UE may include beam failure recovery information as if only one TRP i.e., BFD-RS set is configured in serving cell X, i.e., F is set to 0, AC and ID field may be included where ID is set to BFD-RS set ID 0. AC indicates whether candidate beam is available or not for serving cell X. Candidate RS ID field may be included if candidate beam is available. For serving cell Y, Ci and beam failure recovery information is included as explained earlier.

In an embodiment, if beam failure is detected for a serving cell X which is not configured with multiple BFD-RS sets (or TRPs), BFR is triggered for serving cell and candidate beam evaluation is completed:

The controller 1420 may control the terminal to perform functions according to one of the embodiments described above. For example, the controller 1420 controls the transceiver 1410 and/or memory 1430 to perform according to various embodiments of the disclosure.

In an embodiment, the operations of the terminal may be implemented using the memory 1430 storing corresponding program codes. Specifically, the terminal may be equipped with the memory 1430 to store program codes implementing desired operations. To perform the desired operations, the controller 1420 may read and execute the program codes stored in the memory 1430 by using at least one processor or a CPU.

Figure 15:
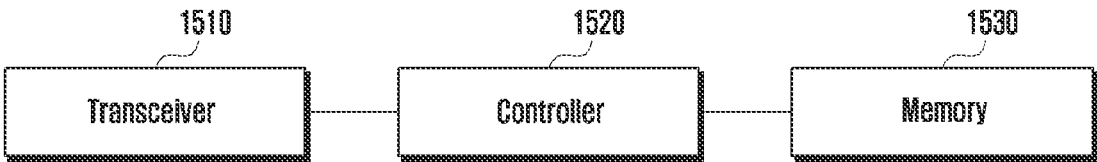
FIG. 15 illustrates a block diagram of a base station according to an embodiment of the present disclosure.

FIG. 15 illustrates a block diagram of a base station according to an embodiment of the present disclosure.

Referring to FIG. 15, a base station includes a transceiver 1510, a controller 1520 and a memory 1530. The controller 1520 may refer to a circuitry, an ASIC, or at least one processor. The transceiver 1510, the controller 1520 and the memory 1530 are configured to perform the operations of the base station illustrated in the FIGS. 1 to 13, or described above. Although the transceiver 1510, the controller 1520 and the memory 1530 are shown as separate entities, they may be realized as a single entity like a single chip. Or the transceiver 1510, the controller 1520 and the memory 1530 may be electrically connected to or coupled with each other.

The transceiver 1510 may transmitand receive signals to and from other network entities, e.g., a terminal.

The controller 1520 may control the base station to perform functions according to one of the embodiments described above. For example, the controller 1520 controls the transceiver 1510 and/or memory 1530 to perform according to various embodiments of the disclosure.

In an embodiment, the operations of the base station may be implemented using the memory 1530 storing corresponding program codes. Specifically, the base station may be equipped with the memory 1530 to store program codes implementing desired operations. To perform the desired

---

1> If beam failure is detected for at least one TRP (or BFD-RS set) for a serving cell Y which is configured with multiple BFD-RS sets (or TRPs), BFR is triggered for BFD-RS set of serving cell Y and candidate beam evaluation is completed for at least one failed TRP (or BFD-RS set) of serving cell Y 2> generate enhanced BFR MAC CE or truncated enhanced BFR MAC CE and transmit to a gNB. (truncated) enhanced BFR MAC CE includes beam failure recovery information of serving cell X and beam failure recovery information of TRP(s)(BFD-RS sets) of serving cell Y 1> else 2> generate legacy BFR MAC CE or legacy truncated BFR MAC CE and transmit to the gNB. Legacy BFR MAC CE includes beam failure recovery information of serving cell X

---

Figure 14:
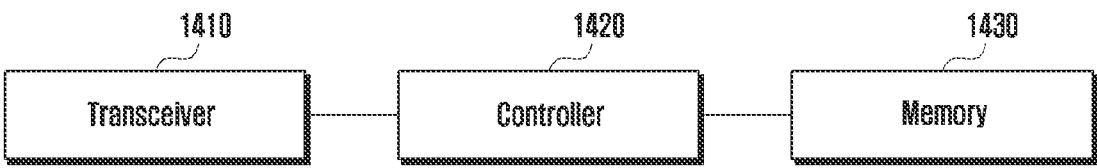
FIG. 14 illustrates a block diagram of a terminal according to an embodiment of the present disclosure.

FIG. 14 illustrates a block diagram of a terminal according to an embodiment of the present disclosure.

Referring to FIG. 14, a terminal includes a transceiver 1410, a controller 1420 and a memory 1430. The controller 1420 may refer to a circuitry, an application-specific integrated circuit (ASIC), or at least one processor. The transceiver 1410, the controller 1420 and the memory 1430 are configured to perform the operations of the terminal illustrated in the FIGS. 1 to 13, or described above. Although the transceiver 1410, the controller 1420 and the memory 1430 are shown as separate entities, they may be realized as a single entity like a single chip. Or the transceiver 1410, the controller 1420 and the memory 1430 may be electrically connected to or coupled with each other.

The transceiver 1410 may transmit and receive signals to and from other network entities, e.g., a base station.

operations, the controller 1520 may read and execute the program codes stored in the memory 1530 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:

receiving configuration information for a serving cell, the configuration information configuring a first beam failure detection (BFD)-reference signal (RS) set and a second BFD-RS set;

identifying whether a first beam failure recovery (BFR) for the first BFD-RS set of the serving cell is triggered;

identifying whether a second BFR for the second BFD-RS set of the serving cell is triggered;

in case that at least one of the first BFR and the second BFR is triggered and not cancelled for the serving cell for which an evaluation of candidate beams has been completed, identifying a BFR medium access control (MAC) control element (CE); and transmitting the BFR MAC CE, wherein the BFR MAC CE comprises:

a first bitmap in which each bit respectively indicates whether a beam failure is detected for at least one BFD-RS set of each serving cell, and a second bitmap indicating whether the beam failure is detected for two BFD-RS sets of one or more serving cells for which the two BFD-RS sets are configured and an evaluation of candidate beams has been completed for the two BFD-RS sets of the one or more serving cells, wherein the second bitmap comprises one or more fields corresponding to the one or more serving cells for which the two BFD-RS sets are configured and the beam failure is detected for at least one of the two BFD-RS sets, wherein the one or more serving cells are indexed sequentially starting with a special cell (SpCell) and followed by one or more secondary cells (SCells) in an ascending order of serving cell indexes, and wherein a number of octets of the second bitmap is determined based on a number of the one or more serving cells.

2. The method of claim 1, wherein:

a bit set to 1 in the first bitmap indicates that the beam failure is detected for at least one BFD-RS set of a corresponding serving cell and beam failure recovery information for the corresponding serving cell with one or more octets is present in the BFR MAC CE;

the first bitmap comprises a special (SP) field for a special cell (SpCell) and one or more fields for one or more secondary cells (SCells);

the one or more fields are indexed sequentially in an ascending order of serving cell indexes;

in case that a highest serving cell index among SCells for which the beam failure is detected for at least one BFD-RS set and for which an evaluation of candidate beams has been completed is less than 8, the first bitmap has a single octet; and in case that the highest serving cell index is equal to or greater than 8, the first bitmap has four octets.

3. The method of claim 1, wherein the BFR MAC CE further comprises at least one octet for each serving cell, and wherein each of at least one octet contains an availability of candidate beam (AC) field, an identifier (ID) field indicating a BFD-RS set associated with a corresponding octet, and either a candidate reference signal identifier (RS ID) field or a reserved (R) bit.

4. The method of claim 1, wherein:

in case that the number of the one or more serving cells is greater than 0 and less than 9, the second bitmap has a single octet;

in case that the number of the one or more serving cells is greater than 8 and less than 17, the second bitmap has two octets;

in case that the number of the one or more serving cells is greater than 16 and less than 25, the second bitmap has three octets; and in case that the number of the one or more serving cells is greater than 24, the second bitmap has four octets.

5. The method of claim 1, wherein the BFR MAC CE includes first beam information for the SpCell and second beam information for the one or more SCells, and wherein the first beam information precedes the second beam information in the BFR MAC CE.

6. A method performed by a base station in a communication system, the method comprising:

transmitting, to a terminal, configuration information of a serving cell, the configuration information comprising a first beam failure detection (BFD)-reference signal (RS) set and a second BFD-RS set; and receiving, from the terminal that identifies that at least one of a first beam failure recovery (BFR) for the first BFD-RS set and a second BFR for the second BFD-RS set is triggered and not cancelled for the serving cell for which an evaluation of candidate beams has been completed, a BFR medium access control (MAC) control element (CE), wherein the BFR MAC CE comprises:

a first bitmap in which each bit respectively indicates whether a beam failure is detected for at least one BFD-RS set of each serving cell, and a second bitmap indicating whether the beam failure is detected for two BFD-RS sets of one or more serving cells for which the two BFD-RS sets are configured and an evaluation of candidate beams has been completed for the two BFD-RS sets of the one or more serving cells, wherein the second bitmap comprises one or more fields corresponding to the one or more serving cells for which the two BFD-RS sets are configured and the beam failure is detected for at least one of the two BFD-RS sets, wherein the one or more serving cells are indexed sequentially starting with a special cell (SpCell) and followed by one or more secondary cells (SCells) in an ascending order of serving cell indexes, and wherein a number of octets of the second bitmap is determined based on a number of the one or more serving cells.

7. The method of claim 6, wherein:

a bit set to 1 in the first bitmap indicates that the beam failure is detected for at least one BFD-RS set of a corresponding serving cell and beam failure recovery information for the corresponding serving cell with one or more octets is present in the BFR MAC CE;

the first bitmap comprises a special (SP) field for a special cell (SpCell) and one or more fields for one or more secondary cells (SCells);

the one or more fields are indexed sequentially in an ascending order of serving cell indexes;

in case that a highest serving cell index among SCells for which the beam failure is detected for at least one BFD-RS set and for which an evaluation of candidate beams has been completed is less than 8, the first bitmap has a single octet; and in case that the highest serving cell index is equal to or greater than 8, the first bitmap has four octets.

8. The method of claim 6, wherein the BFR MAC CE further comprises at least one octet for each serving cell, and wherein each of at least one octet contains an availability of candidate beam (AC) field, an identifier (ID) field indicating a BFD-RS set associated with a corresponding octet, and either a candidate reference signal identifier (RS ID) field or a reserved (R) bit.

9. The method of claim 6, wherein:

in case that the number of the one or more serving cells is greater than 0 and less than 9, the second bitmap has a single octet;

in case that the number of the one or more serving cells is greater than 8 and less than 17, the second bitmap has two octets;

in case that the number of the one or more serving cells is greater than 16 and less than 25, the second bitmap has three octets; and in case that the number of the one or more serving cells is greater than 24, the second bitmap has four octets.

10. The method of claim 6, wherein the BFR MAC CE includes first beam information for the SpCell and second beam information for the one or more SCells, and wherein the first beam information precedes the second beam information in the BFR MAC CE.

11. A terminal in a communication system, the terminal comprising:

a transceiver; and a controller coupled with the transceiver and configured to:

receive configuration information for a serving cell, the configuration information configuring a first beam failure detection (BFD)-reference signal (RS) set and a second BFD-RS set, identify whether a first beam failure recovery (BFR) for the first BFD-RS set of the serving cell is triggered, identify whether a second BFR for the second BFD-RS set of the serving cell is triggered, in case that at least one of the first BFR and the second BFR is triggered and not cancelled for the serving cell for which an evaluation of candidate beams has been completed, identify a BFR medium access control (MAC) control element (CE), and transmit the BFR MAC CE, wherein the BFR MAC CE comprises:

a first bitmap in which each bit respectively indicates whether a beam failure is detected for at least one BFD-RS set of each serving cell, and a second bitmap indicating whether the beam failure is detected for two BFD-RS sets of one or more serving cells for which the two BFD-RS sets are configured and an evaluation of candidate beams has been completed for the two BFD-RS sets of the one or more serving cells, wherein the second bitmap comprises one or more fields corresponding to the one or more serving cells for which the two BFD-RS sets are configured and the beam failure is detected for at least one of the two BFD-RS sets, wherein the one or more serving cells are indexed sequentially starting with a special cell (SpCell) and followed by one or more secondary cells (SCells) in an ascending order of serving cell indexes, and

wherein a number of octets of the second bitmap is determined based on a number of the one or more serving cells.

12. The terminal of claim 11, wherein:

a bit set to 1 in the first bitmap indicates that the beam failure is detected for at least one BFD-RS set of a corresponding serving cell and beam failure recovery information for the corresponding serving cell with one or more octets is present in the BFR MAC CE;

the first bitmap comprises a special (SP) field for a special cell (SpCell) and one or more fields for one or more secondary cells (SCells);

the one or more fields are indexed sequentially in an ascending order of serving cell indexes;

in case that a highest serving cell index among SCells for which the beam failure is detected for at least one BFD-RS set and for which an evaluation of candidate beams has been completed is less than 8, the first bitmap has a single octet; and in case that the highest serving cell index is equal to or greater than 8, the first bitmap has four octets.

13. The terminal of claim 11, wherein the BFR MAC CE further comprises at least one octet for each serving cell, and wherein each of at least one octet contains an availability of candidate beam (AC) field, an identifier (ID) field indicating a BFD-RS set associated with a corresponding octet, and either a candidate reference signal identifier (RS ID) field or a reserved (R) bit.

14. The terminal of claim 11, wherein:

in case that the number of the one or more serving cells is greater than 0 and less than 9, the second bitmap has a single octet;

in case that the number of the one or more serving cells is greater than 8 and less than 17, the second bitmap has two octets;

in case that the number of the one or more serving cells is greater than 16 and less than 25, the second bitmap has three octets; and in case that the number of the one or more serving cells is greater than 24, the second bitmap has four octets.

15. The terminal of claim 11, wherein the BFR MAC CE includes first beam information for the SpCell and second beam information for the one or more SCells, and wherein the first beam information precedes the second beam information in the BFR MAC CE.

16. A base station in a communication system, the base station comprising:

a transceiver; and a controller coupled with the transceiver and configured to:

transmit, to a terminal, configuration information of a serving cell, the configuration information comprising a first beam failure detection (BFD)-reference signal (RS) set and a second BFD-RS set, and receive, from the terminal that identifies that at least one of a first beam failure recovery (BFR) for the first BFD-RS set and a second BFR for the second BFD-RS set is triggered and not cancelled for the serving cell for which an evaluation of candidate beams has been completed, a BFR medium access control (MAC) control element (CE), wherein the BFR MAC CE comprises:

a first bitmap in which each bit respectively indicates whether a beam failure is detected for at least one BFD-RS set of each serving cell, and a second bitmap indicating whether the beam failure is detected for two BFD-RS sets of one or more serving cells for which the two BFD-RS sets are configured and an evaluation of candidate beams has been completed for the two BFD-RS sets of the one or more serving cells, wherein the second bitmap comprises one or more fields corresponding to the one or more serving cells for which the two BFD-RS sets are configured and the beam failure is detected for at least one of the two BFD-RS sets, wherein the one or more serving cells are indexed sequentially starting with a special cell (SpCell) and followed by one or more secondary cells (SCells) in an ascending order of serving cell indexes, and wherein a number of octets of the second bitmap is determined based on a number of the one or more serving cells.

17. The base station of claim 16, wherein:

a bit set to 1 in the first bitmap indicates that the beam failure is detected for at least one BFD-RS set of a corresponding serving cell and beam failure recovery information for the corresponding serving cell with one or more octets is present in the BFR MAC CE;

the first bitmap comprises a special (SP) field for a special cell (SpCell) and one or more fields for one or more secondary cells (SCells);

the one or more fields are indexed sequentially in an ascending order of serving cell indexes;

in case that a highest serving cell index among SCells for which the beam failure is detected for at least one BFD-RS set and for which an evaluation of candidate beams has been completed is less than 8, the first bitmap has a single octet; and in case that the highest serving cell index is equal to or greater than 8, the first bitmap has four octets.

18. The base station of claim 16, wherein the BFR MAC CE further comprises at least one octet for each serving cell, and wherein each of at least one octet contains an availability of candidate beam (AC) field, an identifier (ID) field indicating a BFD-RS set associated with a corresponding octet, and either a candidate reference signal identifier (RS ID) field or a reserved (R) bit.

19. The base station of claim 16, wherein:

in case that the number of the one or more serving cells is greater than 0 and less than 9, the second bitmap has a single octet;

in case that the number of the one or more serving cells is greater than 8 and less than 17, the second bitmap has two octets;

in case that the number of the one or more serving cells is greater than 16 and less than 25, the second bitmap has three octets; and in case that the number of the one or more serving cells is greater than 24, the second bitmap has four octets.

20. The base station of claim 16, wherein the BFR MAC CE includes first beam information for the SpCell and second beam information for the one or more SCells, and wherein the first beam information precedes the second beam information in the BFR MAC CE.

* * * * *